United States Patent Office 3,351,591
Patented Nov. 7, 1967

3,351,591
4-AZOLYL-4'-OXDIAZOLYL-STILBENES
Adolf Emil Siegrist, Basel, Erwin Maeder, Aesch, Basel-Land, Peter Liechti, Binningen, and Leonardo Guglielmetti, Basel, Switzerland, assignors to Ciba Limited, Basel, Switzerland, a company of Switzerland
No Drawing. Filed Aug. 31, 1965, Ser. No. 484,089
Claims priority, application Switzerland, Sept. 14, 1964, 11,919/64
9 Claims. (Cl. 260—240)

ABSTRACT OF THE DISCLOSURE

The compounds of this invention are 4-oxazolyl-4'-oxdiazolyl stilbenes which may be represented by the formula

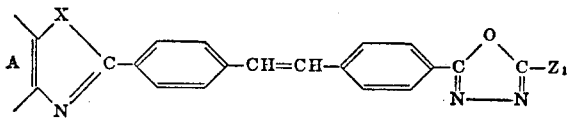

wherein X represents —O— or

in which Q is hydrogen, alkyl, hydroxyalkyl, cyanoalkyl or alkenyl, aralkyl or aryl and A represents naphthalene, tetrahydronaphthalene or a benzene residue attached as indicated by the valence lines and $Z_1$ represents a substituted or unsubstituted member of the group phenyl, β-pyridyl, 2-furoyl, 2-thienyl, β-naphthyl, β-styryl and 4-stilbenzyl.

The above described compounds are especially useful as optical brighteners for organic materials.

---

The present invention provides new, valuable 4-azolyl-4'-oxdiazolyl-stilbenes of the general formula (1a)

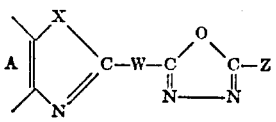

where A represents a naphthalene, tetrahydronaphthalene or especially benzene residue which is condensed with the azole ring in the manner indicated by the valency lines; W represents a stilbene residue linked in position 4 with the azole ring and in position 4' with the oxdiazole ring; Z represents an aryl or aralkenyl residue or a heterocyclic residue of aromatic nature and X stands for —O— or

(in which Q is a hydrogen atom, an alkyl, hydroxyalkyl, cyanoalkyl or alkenyl group or an aralkyl or aryl residue). As aryl residues for Z in the Formula 1a there are suitable, for example, those of the naphthalene series or especially those of the benzene series, as aralkenyl residues preferably styryl residues whose benzene nucleus may be further substituted, and as heterocyclic residues of aromatic nature there are particularly suitable pyridine, furan and thiophene residues. Among these compounds there are of special value those of the formula (1b)

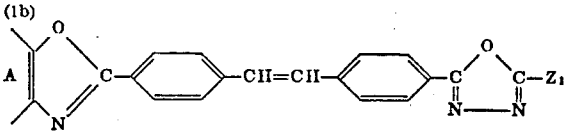

that is to say 4-oxazolyl-4'-oxdiazolyl-stilbenes, where A represents a naphthalene ring, tetrahydronaphthalene ring or especially benzene residue which is condensed with the oxazole ring in the manner indicated by the valency lines, and $Z_1$ represents a possibly substituted benzene, β-pyridyl, 2-furoyl, 2-thienyl, β-naphthyl, β-styryl or 4-stilbenzyl residue.

From among the new 4-azoylyl-4'-oxdiazolyl-stilbenes of the Formula 1a or 1b there may be mentioned above all those compounds which correspond to the Formula 2a

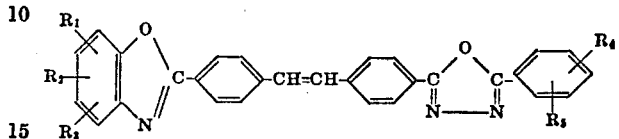

where $R_1$ and $R_2$ are identical or different and each represents a hydrogen atom or halogen atom such as fluorine, bromine or especially chlorine, a linear or branched alkyl group containing up to 18 carbon atoms, for example methyl, ethyl, propyl, isopropyl, butyl, isobutyl, tertiary butyl, isoamyl, n-hexyl, n-octyl, 2-ethylhexyl, n-nonyl, n-dodecyl, n-octadecyl or a residue of the formula (3a)

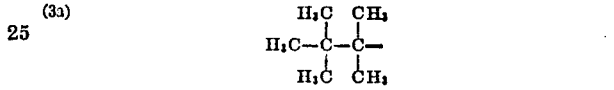

and (3b)

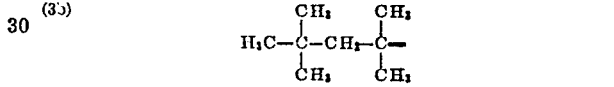

or a cycloalkyl group containing 5 or 6 cyclic members, especially cyclohexyl, a phenylalkyl group, for example benzyl or cumyl, an aryl group, for example phenyl, methylphenyl, chlorophenyl, methoxyphenyl, ethoxyphenyl, isopropoxyphenyl or n-octoxyphenyl, an alkenyl group, a hydroxyalkyl, alkoxyalkyl or halogenalkyl group, a hydroxyl group, an alkoxy group containing up to 18 carbon atoms such as methoxy, ethoxy, propoxy, isopropoxy, n-butoxy, isobutoxy, tertiary butoxy, amoxy, isoamoxy, hexoxy, octoxy, nonoxy, or n-octadecoxy group, an aralkoxy group, a phenoxy group, for example a phenoxy or chlorophenoxy group, a nitrile or cyanoalkyl group, for example cyanoethyl, a carboxyl group, a carboxylic acid ester group containing up to 18 carbon atoms, for example a carboxylic acid alkyl, alkoxyalkyl, alkenyl, aryl or aralkyl ester group, a carboxylic acid amide group which may be substituted by alkyl, aralkyl, cycloalkyl or aryl groups, a carboxylic acid hydrazide group, a carboxyalkyl or carbalkoxy-alkyl group containing up to 12 carbon atoms, such as carboxyethyl, carboxyisopropyl or carbomethoxyethyl, a sulphonic acid group, a sulphonic acid ester group containing up to 18 carbon atoms, such as sulphonic acid alkyl ester or aryl ester groups, a sulphonamide group which contains up to 12 carbon atoms and may be substituted by alkyl or aryl groups, an alkylsulphone or arylsulphone group, for example methylsulphone or phenylsulphone, or an amino group which may be substituted by alkyl, hydroxyalkyl or acyl radicals, and $R_1$ and $R_2$ together with two vicinal carbon atoms of the benzene ring may form a six-membered alicycle; $R_3$ represents a hydrogen atom or a lower alkyl group containing up to 4 carbon atoms, and $R_4$ and $R_5$ are identical or different and each represents a hydrogen atom, a halogen atom, especially chlorine, an alkyl or alkoxy group containing 1 to 8 carbon atoms, a phenyl group, a free or neutralized carboxyl group (—COO cation) or a functionally converted carboxyl group, for example, a carboxylic acid ester group or a carboxylic acid amide group, a free or neutralized sulphonic acid group (—SO₂O cation), a sulphonic acid ester group or a sulphonamide group.

Especially preferred 4-oxazolyl-4'-oxdiazolyl-stilbenes according to this invention correspond to the Formula 2b (2b)
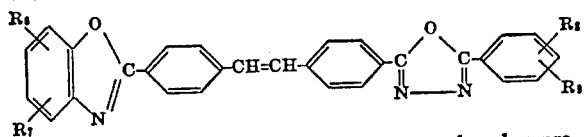

where R₆ and R₇ are identical or different and each represents a hydrogen atom, an alkyl group containing up to 18 carbon atoms, a cyclohexyl group, a phenylalkyl group containing up to 4 carbon atoms in the alkyl group, a phenyl group, an alkylphenyl group containing up to 4 carbon atoms in the alkyl group, an alkoxy group containing up to 12 carbon atoms, a cyanoalkyl group containing up to 4 carbon atoms, a carboxyl group, a carboxylic acid ester group, a carbonamide group, a carbalkoxyalkyl group, or R₆ together with R₇ and the benzene ring represent a tetrahydronaphthalene ring, and R₈ and R₉ are identical or different and each represents a hydrogen atom, a halogen atom (especially chlorine), an alkyl or alkoxy group containing 1 to 8 carbon atoms, a phenyl group, a carboxyl group, a carboxylic acid ester group containing up to 18 carbon atoms in the ester grouping, a carbonamide group or a nitrile group.

Among these compounds there are specially important for practical uses those in which R₇ and R₉ each represents a hydrogen atom, R₆ represents a residue (of the meaning defined in Formula 2b) in position 5 or 6 of the benzoxazole ring of the Formula 2b, and R₈ stands for a substituent in position 4' of the phenyl residue linked with the oxdiazole ring, which likewise has the same meaning as in the Formula 2a.

The new 4-azolyl-4'-oxdiazolyl-stilbenes of the general Formula 1a can be prepared by various methods.

According to one process, for example, an azolyl-stilbene monocarboxylic acid halide, especially an acid chloride, of the formula (4)
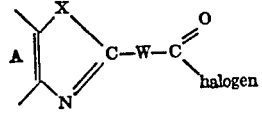

(where A, W and X have the above meanings) is reacted with a monoacylhydrazine of the formula (5)
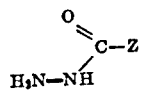

(where Z has the above meaning) in the presence of an organic solvent, and the resulting diacylhydrazine of the formula (6)
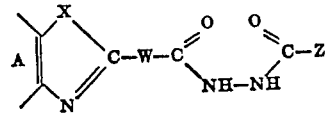

if necessary after intermediate isolation, is treated with a dehydrating agent, especially a non-sulphonating dehydrating agent, for example thionylchloride.

According to another process for the manufacture of the new 4-azolyl-4'-oxdiazolyl-stilbenes an azolyl-stilbene monocarboxylic acid hydrazine of the formula (7)
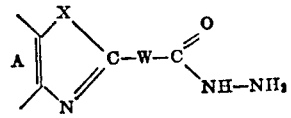

(where A, W and X have the above meanings) is reacted in the presence of an organic solvent with a monocarboxylic acid halide, especially acid chloride, of the formula (8)
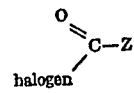

and the resulting diacylhydrazine of the Formula 6—if desired after previous isolation—is treated with a dehydrating agent, especially a non-sulphonating dehydrating agent such as thionylchloride.

The reaction of the acid halides of the Formula 4 or 8 with the carboxylic acid hydrazides of the Formula 5 or 7 to form the acylhydrazine of the Formula 6 can be carried out in the presence of a tertiary nitrogen base, advantageously at a temperature from 50 to 150° C. It is advantageous to use for this purpose a tertiary nitrogen base whose boiling point is not too low, preferably one that does not boil below 100° C., for example N,N-diethylaniline or N,N-dimethylaniline. Particularly good results have been achieved with cyclic tertiary nitrogen bases such as quinoline and above all pyridine bases such as pyridine itself and an alkylpyridine containing lower alkyl groups, such as 2-, 3- and 4-methylpyridine (picolines), ethylpyridines or mixtures of such pyridine bases.

It has proved particularly advantageous to perform the reaction leading to the acylhydrazine of the Formula 6 in a high-boiling, inert, little polar organic solvent, for example ortho-dichlorobenzene or trichlorobenzene, in the presence of the stoichiometrically required amount of a pyridine base because the subsequent cyclization leading to the 1,3,4-oxdiazole without intermediate isolation of the acylhydrazine by dropping in slightly more than the stoichiometrically required amount of thionylchloride at a temperature within the range from 120 to 220° C., advantageously at the boiling temperature of the reaction mixture, proceeds quickly and smoothly.

The new 4-azolyl-4'-oxdiazolyl-stilbenes of the Formula 1a are also obtained when an oxdiazolyl-stilbene compound of the formula (9)
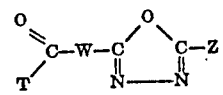

(where W and Z have the above meanings and T stands for a hydroxyl group or a halogen atom, especially chlorine) is reacted with an ortho-amino compound of the formula

(10)
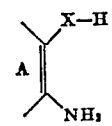

(where A and X have the above meanings) according to the following scheme of reactions:

(11)

The reaction of the reactants (9) and (10) according to the last-described process can be performed with or without intermediate isolation of the primarily formed amides of the Formula 11 by heating equimolecular amounts of the reactants at an elevated temperature, for example at 120 to 350° C., advantageously in an inert gas, for example in a current of nitrogen; if desired or required, the reaction is carried out in the presence of a catalyst. Suitable catalysts are, for example, boric acid, boric anhydride, zinc chloride, para-toluenesulphonic acid, also polyphosphoric acids including pyrophosphoric acid. When boric acid is chosen as catalyst, it is advantageous to use it in an amount of 0.5% to 5%, referred to the weight of the reaction mass as a whole. There may be additionally used high-boiling, polar organic solvents, for example dimethylformamide, dichlorobenzene, trichlorobenzene or aliphatic, possibly etherified, hydroxy compounds, for example propyleneglycol, ethyleneglycol monoethyl ether or diethyleneglycol diethyl ether or high-boiling esters of phthalic acid, for example phthalic acid dibutyl ester.

It is, however, preferable to carry out the last-mentioned process in two stages: In the first stage, especially the carboxylic acid chloride of the Formula 9 is condensed in an equimolecular proportion with the ortho-amino compound of the Formula 10 in the presence of an organic solvent such as toluene, a xylene, chlorobenzene, dichlorobenzene, trichlorobenzene or nitrobenzene, at a temperature from 100 to 200° C., whereupon the resulting acyl compound of the Formula 11 is converted into the 4-azolyl-4'-oxdiazolyl-stilbene at a temperature ranging from 150 to 350° C., if desired or required in the presence of a catalyst. When the starting material used is a carboxylic acid chloride, it can be prepared immediately before the condensation with the orthoamino compound and without isolation from the corresponding free carboxylic acid and thionylchloride, if desired or required in the presence of a catalyst, such as pyridine, in the solvent in which subsequently the condensation is to be carried out.

The oxdiazolyl-stilbene compounds of the Formula 9 to be used as starting materials in the last-mentioned process can be prepared by known methods, for example according to the following reaction scheme A or B.

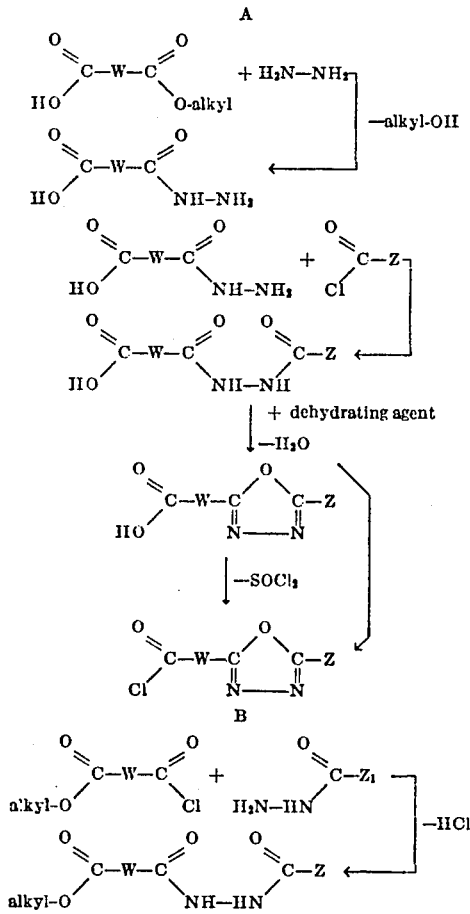

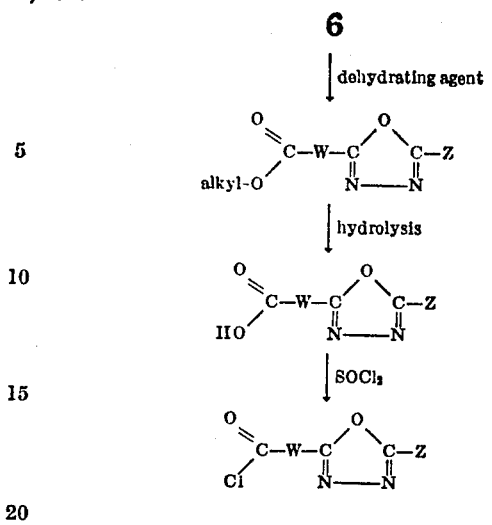

The azolyl-stilbene monocarboxylic acid halides (e.g. the acid chlorides) of the Formula 4 and the azolyl-stilbene monocarboxylic acid hydrazides of the Formula 7 to be used as starting materials in the two first-named processes are likewise accessible by known methods, for example according to the following reaction scheme C:

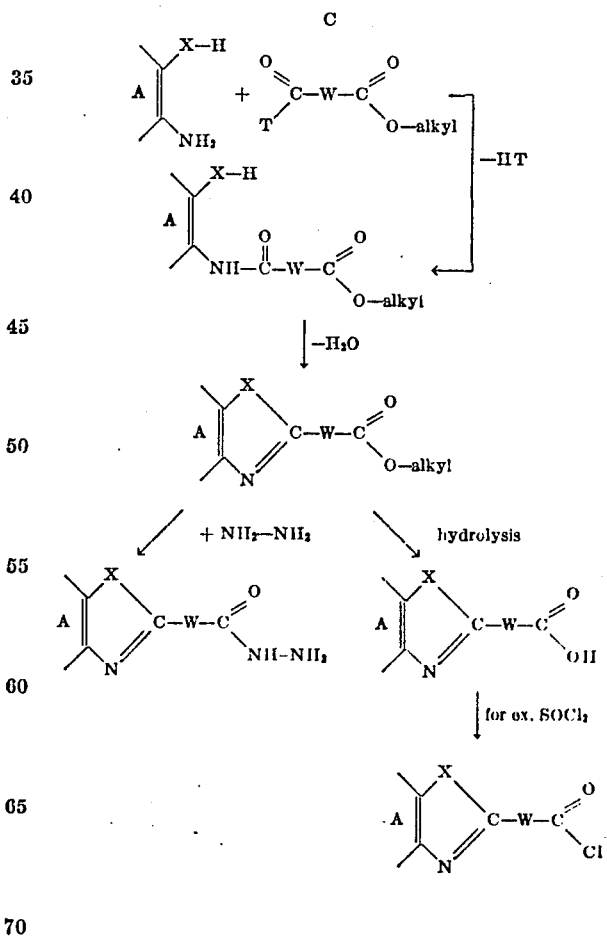

As examples of new 4-azolyl-4'-oxdiazolyl-stilbenes of the Formula 1a or 2b that can be manufactured by the processes described above there may be mentioned the following compounds:

The compound of the formula (12)

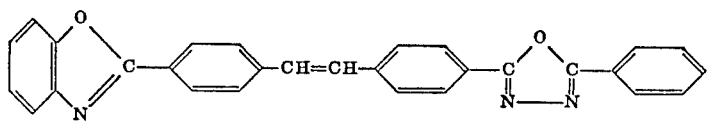

as well as its analogue of the Formula 45 which is substituted by a phenyl group in position 5 of the benzoxazole ring; the compound of the formula (13)

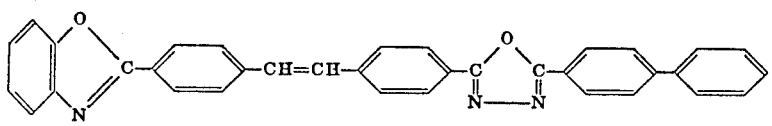

and its analogue of the Formula 31 which is substituted by a methyl group in position 5 of the benzoxazole ring, (14)

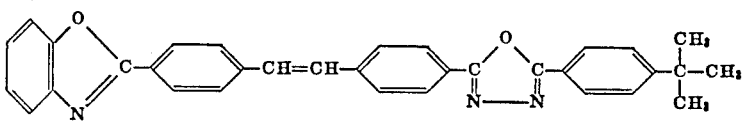

(15)

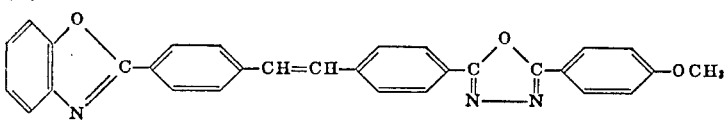

(16)

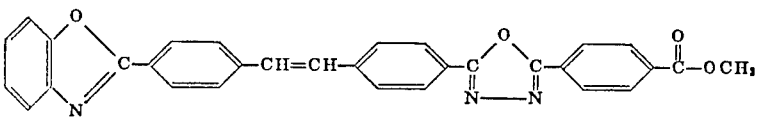

If desired, the 4-azolyl-4'-oxdiazolyl-stilbenes of the Formula 1a obtained by the processes described above may be used in further reactions. Thus, water-soluble derivatives are obtained when (a) the stilbene derivative of the Formula 1a is sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts;

(b) one or several primary or secondary amino groups of the stilbene derivative of the Formula 1a is converted with sultones, e.g. with propanesultone or butanesultone at an elevated temperature into the corresponding alkylsulphonic acid derivative;

(c) one or several primary amino groups of the stilbene derivative of the Formula 1a are converted with aldehyde-bisulphite compounds e.g. with formaldehyde-alkali metal bisulphite, into the corresponding ω-methanesulphonic acid derivative;

(d) one or several primary amino groups of the stilbene derivative of the Formula 1a are reacted with alkylsulphonic or aralkylsulphonic acids, e.g. bromoethanesulphonic acid or benzylchloride-sulphonic acid;

(e) one or several primary or secondary amino groups or hydroxyl groups of the stilbene derivative of the Formula 1a are linked through s-triazin-2-yl bridges with phenolsulphonic acids or anilinesulphonic acids;

(f) in one or several hydroxyl groups of the stilbene derivative of the Formula 1a a polyalkylene ether chain which is sufficiently long to ensure solubility in water is introduced by means of an alkylene oxide such as ethylene oxide or propylene oxide or with a polyalkylene ether monohalide;

(g) one or several groups capable of quaternation present in the stilbene derivative of the Formula 1a are reacted with quaternating agents e.g. methyliodide, dimethylsulphate, benzylchloride or toluenesulphonic acid alkyl esters at an elevated temperature, if necessary under superatmospheric pressure;

(h) one or several halogenoalkyl groups of the stilbene derivative of the Formula 1a are converted into the corresponding quaternary derivative with tertiary bases e.g. pyridine.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope.

I. Synthetic organic materials of high or low molecular weight:

(a) Polymers based on organic compounds containing at least one polymerizable carbon-to-carbon double bond, i.e. their homopolymers and copolymers and products obtained by after-treating them, such as cross-linked, grafted or decomposition products, polymer dilutions or the like; relevant examples are:

Polymers based on α,β-unsaturated carboxylic acids, especially of acryl compounds (e.g. acrylic esters, acrylic acids, acrylonitrile, acrylamides and their derivatives or their methacrylic analogues), of olefinic hydrocarbons (e.g. ethylene, propylene, isobutylene, styrenes, dienes, especially butadiene, isoprene i.e. also rubbers and rubber-like polymers; furthermore so-called ABS polymers), based on vinyl and vinylidene compounds (e.g. vinyl esters, vinylchloride, vinylsulphonic acid, vinyl ethers, vinyl alcohol, vinylidene chloride, vinylcarbazole), of halogenated hydrocarbons (chloroprene, highly halogenated ethylenes), of unsaturated aldehydes and ketones (e.g. acrolein or the like), of allyl compounds or the like; graft polymerization products (e.g. by grafting vinylic monomers), cross-linked products (e.g. by means of bifunctional or polyfunctional cross-linking agents such as divinylbenzene, polyfunctional allyl compounds or bisacryl compounds), or products accessible by partial decomposition (hydrolysis, depolymerization) or modification of reactive groupings (e.g. esterification, etherification, halogenation, auto-crosslinking).

(b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts;

(c) Polycondensation products or precondensates based on bifunctional or polyfunctional compounds containing condensable groups, their homo- and co-condensates and products obtained by after-treating them; relevant examples are:

Polyesters, saturated (e.g. polyethylene terephthalate) or unsaturated (e.g. maleic acid-dialcohol polycondensates and their crosses-linked products with polymerizable vinyl monomers), linear or branched (also those based on polyhydric alcohols e.g. alkyd resins).

Polyamides (e.g. hexamethylenediamine adipate), maleinate resins, melamine resins, phenolic resins (novolaks), aniline resins, furan resins, carbamide resins and their precondensates, and similarly constituted products, polycarbonates, silicone resins and others.

(d) Polyadducts such as polyurethanes (if desired cross-linked), epoxy resins.

II. Semisynthetic organic materials e.g. cellulose esters or mixed esters (acetate, propionate, nitrocellulose, cellulose ethers), regenerated cellulose, viscose, cuprammonium cellulose) or products obtained by after-treating them; casein plastics.

III. Natural organic materials of animal or vegetable origin, e.g. based on cellulose or proteins such as wool, cotton, silk, bast, jute, hemp, furs and hairs, leathers, finely dispersed wood masses, natural resins (such as colophony, especially lacquer resins); furthermore rubber, gutta percha, balata and products obtained by after-treating or modifying them (e.g. by curing, cross-linking or grafting), decomposition products (e.g. by hydrolysis, depolymerization), products accessible by conversion of reactive groups (e.g. by acylation, halogenation, cross-linking or the like).

The organic materials that can be optically brightened may be at any stage of their processing (raw materials, semi-finished products or finished articles) and physical states. They may be in the form of structures of any desired shape, that is to say, for example, they may be predominantly three-dimensional bodies such as blocks, plates, sections, pipes, injection mouldings or components of any desired kind, chips or granulates, formed articles; predominantly two-dimensional bodies such as filaments, fibres, flocks, bristles or wires. The said materials may also be as yet not shaped and be in the most varied homogeneous and inhomogeneous forms of dispersion and physical states, for example in the form of powders, solutions, emulsions, dispersions, latices (e.g. lacquer solutions, polymer dispersions), sols, gels, putties, pastes, waxes, adhesives, pore fillers or the like.

Fibrous materials may, for example, take the form of continuous filaments, staple fibers, flocks, hanks, textile threads, yarns, doubled yarns, fibre fleeces, felts, cotton-wool, flocculated products or of textile fabrics or textile laminates, knitwear, of papers, cardboards, paper pulps or the like.

The compounds to be used according to this invention are of special value for the treatment of textile organic materials, especially woven textile fabrics. If fibres—which may be staple fibres or continuous filaments, in the form of hanks, woven or knitted fabrics, fleeces, flocculated substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films, foils, tapes or mouldings they may be added to the moulding or injection moulding composition or they may be dissolved, dispersed or in any other way finely and homogeneously distributed in the spinning mass before spinning. The optical brighteners may also be added to the starting materials, reaction mixtures or intermediate products used to produce fully synthetic or semi-synthetic organic materials, that is to say before or during the chemical reaction, e.g. a polycondensation (including the precondensates), a polymerization (including the prepolymer) or a polyaddition.

The new optical brighteners can, of course, also be used whenever organic materials of the kind indicated above are combined with inorganic materials in any desired form (typical examples: detergents, white pigments in organic substances).

The new optical brighteners are distinguished by their particularly good heat resistance and fastness to light and to migration.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synethetic dressings. It may be of advantage to add the products of this invention to the liquors used for producing an anti-crease finish.

(d) In combination with detergents, the detergent and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives to a wide variety of industrial products to improve their presentation or to obviate disadvantages in their use, for example as additives to glues, adhesives, paints or the like.

The compounds of the above formulae can be used as scintillators for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

When treating a number of fibrous substrates, e.g. polyester fibers, with the brighteners of this invention it is advantageous to impregnate these fibres with an aqueous dispersion of the brightener at a temperature below 75° C., e.g. at room temperature, and then to subject them to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry heat treatment may follow immediately upon each other or they may be performed in a single stage.

*Example 1*

A mixture of 9.18 g. of the diacylhydrazine of the formula

(17)
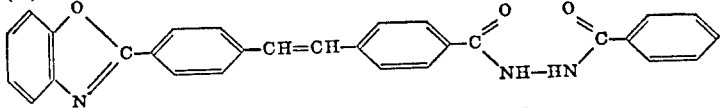

and 150 ml. of thionylchloride is stirred for 24 hours under reflux. The excess thionylchloride is then distilled off, the residue triturated with water, suctioned, washed with water and then with methanol and dried, to yield about 8.4 g. (=94% of theory) of 4 - [benzoxazolyl-(2″)] - 4′ - [5‴ - phenyl - (1″″) - 1‴,3‴,4‴ - oxdiazolyl-(2‴)]-stilbene of the Formula 12

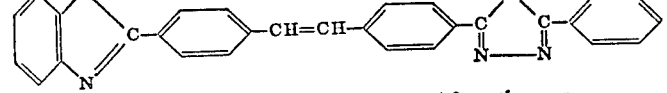

in the form of a light-brown powder. After three recrystallizations from ortho-dichlorobenzene with the aid of bleaching earth there are obtained small, light-yellow, shiny needles melting at 287 to 288° C.

$C_{29}H_{19}O_2H_3$: mol. weight, 441.47. Calculated: C, 81.22%; H, 4.48%; N, 8.12%. Found: C, 81.03%; H, 4.73%; N, 8.17%.

The diacylhydrazine of the Formula 17 used as starting material can be prepared in the following manner:

A solution of 324 g. of stilbene-4,4′-dicarboxylic acid diethyl ester in 1 litre of ethanol and 4 litres of dioxane is mixed at 40° C. with 100 ml. of 10 n-sodium hydroxide solution. After stirring for 1 hour at 40° C. the resulting thick, cream-coloured paste is cooled to room temperature (about 20° C.), suctioned, washed with dioxane and thoroughly expressed. The moist suction filter cake is stirred for 2 hours in 10 litres of hydrochloric acid of 5% strength, suctioned off and washed neutral with water.

The crude suction filter cake is stirred for 60 minutes in 2 litres of N-aqueous triethanolamine solution and the undissolved matter is filtered off. The solution is acidified with concentrated hydrochloric acid, the resulting precipitate is suctioned off, washed until neutral and dried, to yield about 231 g. of the monocarboxylic acid of the formula

(18)
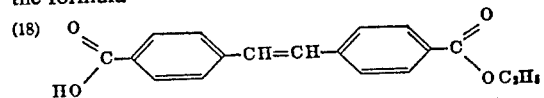

in the form of a colourless powder whose melting point depends largely on the heating speed (230 to 300° C.).

$C_{18}H_{16}O_4$: mol. weight, 296.31. Calculated: C, 72.96%; H, 5.44%; O, 21.60%. Found: C, 72.75%; H, 5.40%; O, 21.34%.

When the monocarboxylic acid of the Formula 18 is boiled for 3 hours in excess thionylchloride, the acid chloride of the formula

(19)
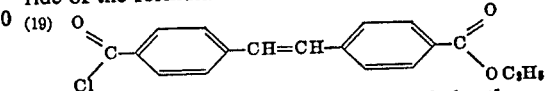

is obtained in a yield of about 97% of the theoretical. Colourless crystals from tetrachloroethylene, melding at 134 to 136° C.

$C_{18}H_{15}O_3Cl$: mol. weight, 314.77. Calculated: C, 68.68%; H, 4.80%, Cl 11.26%. Found: C, 68.28%; H, 4.83%; Cl, 11.54%.

A mixture of 31.4 g. of the acid chloride of the Formula 19, 11.0 g. of 1-hydroxy-2-aminobenzene and 500 ml. of dry ortho-dichlorobenzene is stirred for 15 hours at 136° C.; the dark solution is mixed with 1 g. of boric acid, heated to 180° C. while distilling off 300 ml. of ortho-dichlorobenzene and 2 ml. of water, and further stirred at this temperature for 2 hours. After cooling, suctioning, washing with methanol and drying there are obtained about 24.2 g. of the compound of the formula

(20)
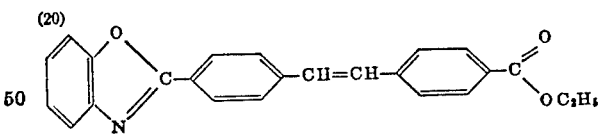

in the form of a light-brown powder melting at 210 to 220° C. Recrystallization from tetrachloroethylene with the aid of bleaching earth furnishes a yellow, crystalline powder melting at 227 to 229° C.

$C_{24}H_{19}O_3N$: mol. weight, 369.40. Calculated: C, 78.03%; H, 5.18%; N, 3.79%. Found: C, 78.33%; H, 5.27%; N, 3.75%.

39.6 grams of the ethyl ester of the Formula 20 in 300 ml. of dioxane are saponified with 20 ml. of 10 n-sodium hydroxide solution for 4½ hours at 85 to 90° C. After addition of 100 ml. of methanol the batch is cooled to room temperature, suctioned and washed with methanol. The moist filter cake is taken up in 1 litre of dimethylformamide, mixed at 100° C. with 40 ml. of concentrated hydrochloric acid, cooled, suctioned, washed and dried, to yield about 32.2 g. of the compound of the formula

(21)
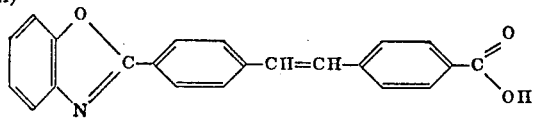

in the form of a light-yellow powder melting at 318 to 320° C. Sublimation in a high vacuum at 285° C. furnishes light-yellow crystals of identical melting point.

$C_{22}H_{15}O_3N$: mol. weight, 341.35. Calculated: C, 77.40%; H, 4.43%; N, 4.10%. Found: C, 77.30%; H, 4.60%; N, 4.18%.

Occasionally the acid is obtained in a form melting at 349 to 350° C.

The 4-[benzoxazolyl-(2″)]-stilbene-4′-carboxylic acid of the Formula 21 is converted in known manner by boiling in excess thionylchloride in the presence of a catalytic amount of pyridine into the acid chloride of the formula

(22)
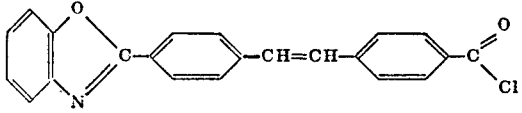

which is obtained in a yield of about 87% of the theoretical. On recrystallization from ortho-dichlorobenzene it forms yellow crystals melting at 266 to 268° C.

$C_{22}H_{14}O_2NCl$: mol. weight, 359.81. Calculated: C, 73.44%; H, 3.92%; N, 3.89%. Found: C, 73.42%; H, 4.04%; N, 3.86%.

A mixture of 7.2 g. of the acid chloride of the Formula 22, 2.72 g. of benzoic acid monohydrazide and 100 ml. of pyridine is stirred first while being cooled with ice, then at room temperature and finally for 5 hours at 90 to 95° C. After cooling, the reaction mixture is poured into 1500 ml. of water, suctioned, washed with cold and then with hot water and dried, to yield about 8.4 g. of the diacylhydrazine of the Formula 17 in the form of an almost colourless powder which is used for the ring closure without purification.

The following benzoxazolyl-oxdiazolyl-stilbene compounds can be prepared in a similar manner:

(13)
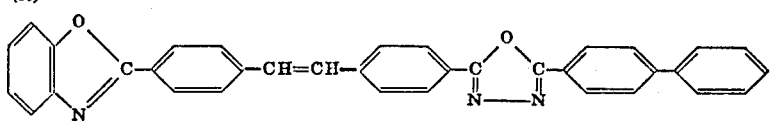

Pale yellow, shiny flakes from ortho-dichlorobenzene, melting at 305 to 306° C.

$C_{35}H_{23}O_2N_3$: mol. weight, 517.59. Calculated: C, 78.89%; H, 4.34%; N, 9.55%. Found: C, 78.54%; H, 4.39%; N, 9.55%.

(14)
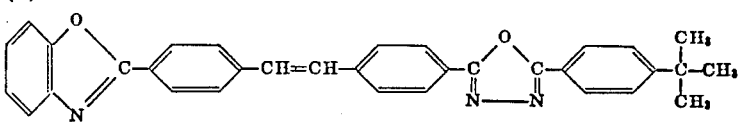

Light greenish yellow, fine needles from ortho-dichlorobenzene, melting at 290 to 291° C.

$C_{33}H_{27}O_2N_3$: mol. weight, 497.57. Calculated: C, 79.65%; H, 5.47%; N, 8.45%. Found: C, 79.50%; H, 5.48%; N, 8.25%.

(23)
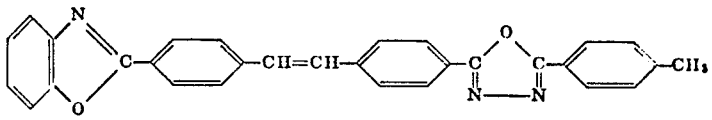

Light-yellow felted needles from ortho-dichlorobenzene, melting at 296 to 297° C.

$C_{30}H_{21}O_2N_3$: mol. weight 455.49. Calculated: C, 79.10%; H, 4.65%; N, 9.23%. Found: C, 79.13%; H, 4.73%; N, 9.17%.

(24)
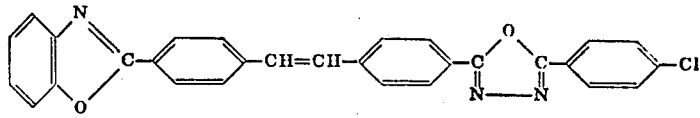

Fine, yellow needles from ortho-dichlorobenzene, melting at 322 to 323° C.

$C_{29}H_{18}O_2N_3Cl$: mol. weight, 475.94. Calculated: C, 73.19%; H, 3.81%; N, 8.83%. Found: C, 73.43%; H, 3.70%; N, 8.88%.

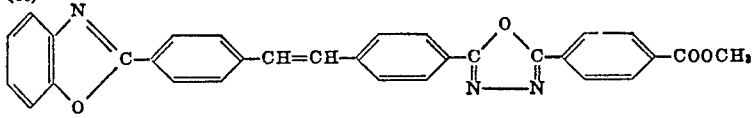

Light-yellow fine needles from ortho-dichlorobenzene, melting at 317.5 to 318.5° C.

$C_{31}H_{21}O_4N_3$: mol. weight, 499.50. Calculated: C, 74.54%; H, 4.24%; N, 8.41%. Found: C, 74.41%; H, 4.29%; N, 8.46%.

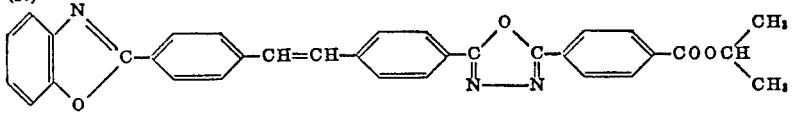

Light-yellow flakes from ortho-dichlorobenzene, melting at 300° C.

$C_{33}H_{25}O_4N_3$: mol. weight, 527.55. Calculated: C, 75.13%; H, 4.78%; N, 7.97%. Found: C, 74.98%; H, 4.84%; N, 7.66%.

*Example 2*

7.4 parts of 4-[5''-methyl-benzoxazolyl-(2'')]-stilbene-4'-carboxylic acid hydrazide of the formula

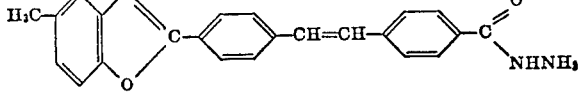

are suspended in 90 parts by volume of dry dichlorobenzene and 5.4 parts of 4-octoxybenzoylchloride are added. Then 4 parts by volume of anhydrous pyridine are added and the whole is raised within 1 hour to the reflux temperature, whereupon a turbid solution forms. In the course of 15 minutes 6 parts by volume of thionylchloride are dropped in at a rate such that the reflux temperature of the reaction mixture remains above 168° C. The batch is stirred on for 10 minutes and then allowed to cool to room temperature. The precipitate is suctioned off and rinsed with toluene and alcohol. The residue is disolved in boiling xylene, mixed with bleaching earth, filtered clear, concentrated and allowed to cool. After suctioning, washing with methanol and drying there are obtained about 6.4 parts of the compound of the formula

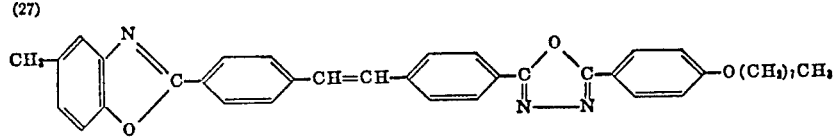

in the form of a light-yellow finely crystalline powder melting at 293 to 295° C.

$C_{38}H_{37}O_3N_3$: mol weight, 583.70. Calculated: C, 78.19%; H, 6.40%; N, 7.20%. Found: C, 78.29%; H, 6.55%; N, 7.12%.

The 4-[5''-methyl-benzoxazolyl-(2'')]-stilbene-4'-carboxylic acid hydrazide of the Formula 26 used as starting material can be prepared in the following manner:

98.8 grams of 4-carboxystilbene-4'-carboxylic acid ethyl ester of the Formula 18 are suspended in 600 ml. of dry dichlorobenzene, 200 ml. of thionylchloride and 0.5 ml. of pyridine are added and the mixture is stirred for 3 hours at 90 to 100° C., after which the evolution of hydrochloric acid ceases and a dark solution has formed. The excess thionylchloride is completely evaporated under vacuum. The residue is cooled to room temperature and 41.1 g. of 1-amino-2-hydroxy-5-methylbenzene are added. The batch is heated within one hour to the reflux temperature, during which at about 110° C. evolution of hydrochloric acid sets in. When hydrochloric acid is no longer being liberated, 2 g. of boric anhydride are added and the temperature is raised to such a value that within 2 hours the bulk of the solvent passes over together with the liberated water. A dark, slightly turbid melt is obtained which is stirred on for 30 minutes at 230 to 235° C. The dark melt is then mixed dropwise with 330 ml. of dimethylformamide, whereupon a dark solution is obtained. The finely crystalline precipitate is suctioned off at room temperature, rinsed with a small amount of dimethylformamide and dried, to yield about 100 g. of a yellow powder melting at 280 to 284° C.

Crystallization from chlorobenzene with the aid of bleaching earth furnishes the compound of the formula

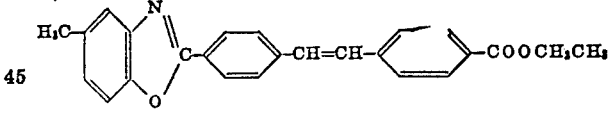

in the form of light-yellow greenish tinsel melting at 282 to 283° C.

$C_{25}H_{21}NO_3$: mol. weight, 383.43. Calculated: C, 78.31%; H, 5.52%; N, 3.65%. Found: C, 78.28%; H, 5.50%; N, 3.59%.

91.9 grams of 4-[5''-methyl-benzoxazolyl-(2'')]-stilbene-4'-carboxylic acid ethyl ester of the Formula 28 in 1500 ml. of ethyleneglycol monomethyl ether are raised to the boil, whereupon a clear solution forms; 150 ml. of hydrazine hydrate are run in and the whole is refluxed for 20 hours with vigorous stirring, to form a thick, yellow suspension, which is suctioned at room temperature and washed with a small amount of ethyleneglycol monomethyl ether and then with alcohol until the washings run neutral. On drying, there are obtained about 81 g. of the hydrazide of the Formula 26 as a yellowish powder which can be used for the further condensation without previous purification.

The following benzoxazolyl - oxdiazolyl - stilbene compounds can be prepared in a similar manner:

(29)

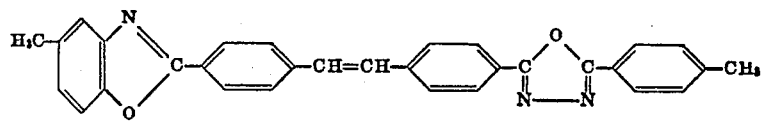

Pale-yellow, fine needles from ortho-dichlorobenzene, melting at 308 to 310° C.

$C_{31}H_{24}N_3O_2$: mol. weight, 469.52. Calculated: C, 79.30%; H, 4.94%; N, 8.95%. Found: C, 79.10%; H, 4.96%; N, 8.84%.

(30)

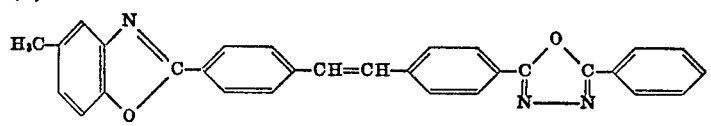

Light-yellow flakes from ortho-dichlorobenzene, melting at 288 to 290° C.

$C_{30}H_{21}O_2N_3$: mol. weight, 455.49. Calculated: C, 79.10%; H, 4.65%; N, 9.23%. Found: C, 79.25%; H, 4.67%; N, 9.13%.

(31)

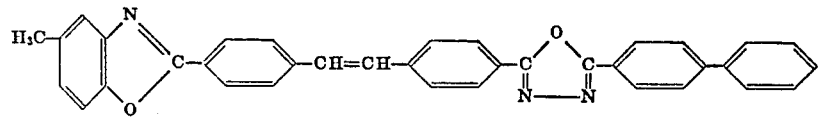

Pale-yellow, felted, small needles from ortho-dichlorobenzene, melting at 323 to 325° C.

$C_{36}H_{25}N_3O_2$: mol. weight, 531.58. Calculated: C, 81.33%; H, 4.74%; N, 7.91%. Found: C, 81.31%; H, 4.60%; N, 8.20%.

(32)

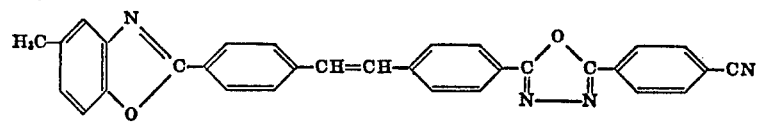

Orange-yellow powder from ortho-dichlorobenzene, melting at 319 to 321° C.

$C_{31}H_{20}N_4O_2$: mol. weight, 480.50. Calculated: C, 77.48%; H, 4.21%; N, 11.66%. Found: C, 77.32%; H, 4.32%; N, 11.75%.

(33)

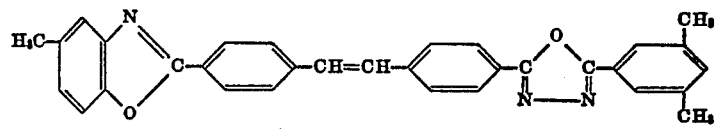

Yellow, crystalline powder from chlorobenzene, melting at 258 to 259° C.

$C_{32}H_{25}N_3O_2$: mol. weight, 483.54. Calculated: C, 79.48%; H, 5.21%; N, 8.69%. Found: C, 79.20%; H, 5.32%; N, 8.59%.

(34)

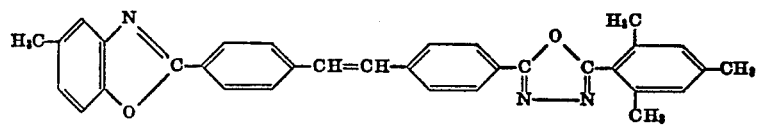

Light-yellow, crystalline powder from dimethylformamide, melting at 247 to 248° C.

$C_{33}H_{27}N_3O_2$: mol. weight, 497.57. Calculated: C, 79.65%; H, 5.47%; N, 8.45%. Found: C, 79.37%; H, 5.36%; N, 8.30%.

(35)

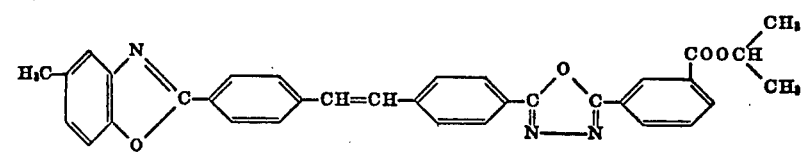

Light-yellow, crystalline powder from chlorobenzene, melting at 285° C.

$C_{34}H_{27}N_3O_4$: mol. weight, 541.58. Calculated: C, 75.40%; H, 5.03%; N, 7.76%. Found: C, 75.16%; H, 5.03%; N, 7.78%.

(36)
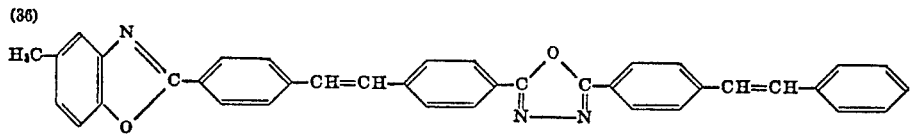

Pale-yellow, felted, small needles from ortho-dichlorobenzene, melting at 340° C.

$C_{38}H_{27}N_3O_2$: mol. weight, 557.62. Calculated: C, 81.84%; H, 4.88%; N, 7.53%. Found: C, 81.74%; H, 5.12%; N, 7.71%.

(37)
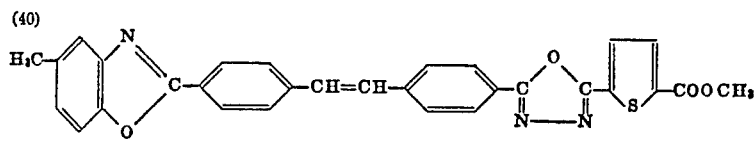

Pale-yellow, crystalline powder from ortho-dichlorobenzene, melting at 278 to 280° C.

$C_{29}H_{20}N_4O_2$: mol. weight, 456.48. Calculated: C, 76.30%; H, 4.42%; N, 12.27%. Found: C, 76.00%; H, 4.44%; N, 12.20%.

(38)
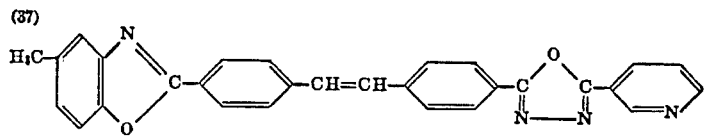

Small, yellow needles from ortho-dichlorobenzene, melting at 281 to 283° C.

$C_{28}H_{19}O_3N_3$: mol. weight, 445.46. Calculated: C, 75.49%; H, 4.30%; N, 9.43%. Found: C, 75.16%; H, 4.35%; N, 9.50%.

(39)
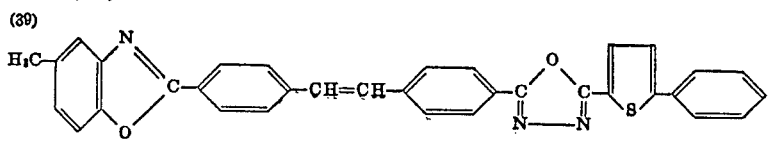

Small, brilliant yellow needles from ortho-dichlorobenzene, melting at 341 to 343° C.

$C_{34}H_{23}O_2N_3S$: mol. weight, 537.64. Calculated: C, 75.96%; H, 4.31%; N, 7.82%. Found: C, 76.15%; H, 4.50%; N, 7.83%.

(40)
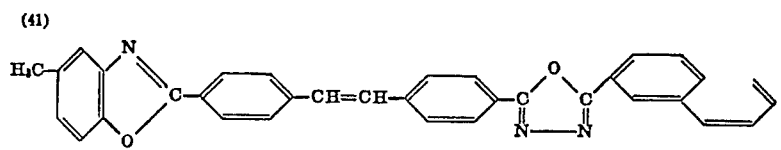

Light-yellow, small needles from ortho-dichlorobenzene, melting at 300° C.

$C_{30}H_{21}O_4N_3$—Calculated: C, 69.35%; H, 4.07%; N, 8.09%; S, 6.17%. Found: C, 69.31%; H, 4.09%; N, 7.96%; S, 6.23%.

(41)
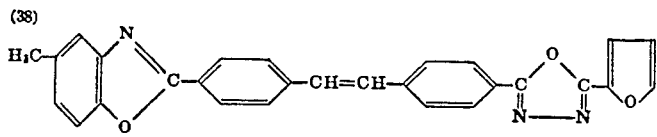

Yellow, crystalline powder from dimethylformamide, melting at 278 to 280° C.

$C_{34}H_{23}O_2N_3$: mol. weight, 505.55. Calculated: C, 80.77%; H, 4.59%; N, 8.31%. Found: 80.52%; H, 4.66%; N, 8.25%.

(42)
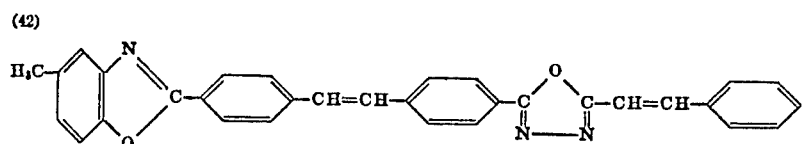

melting at 295 to 297° C.

$C_{32}H_{23}O_2N_3$: mol. weight, 481.53. Calculated: C, 79.81%; H, 4.81%; N, 8.73%. Found: C, 79.72%; H, 4.80%; N, 8.85%.

20, to yield 16 g. of 4-[5″-tertiary butyl-benzoxazolyl-(2″)]-stilbene-4-carboxylic acid ethyl ester of the formula

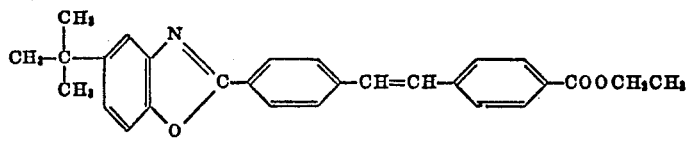

Example 3

A mixture of 9.5 g. of 4-[5″-tertiary butyl-benzoxazolyl-(2″)]-stilbene-4′-carboxylic acid of the formula

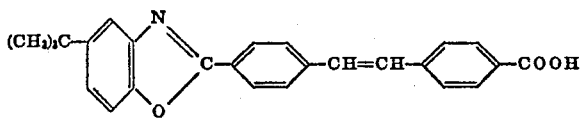

100 ml. of dichlorobenzene, 20 ml. of thionylchloride and 3 drops of pyridine is heated for 4 hours at 90 to 95° C.; hydrochloric acid escapes and a clear solution forms. The excess thionylchloride is then completely evaporated under vacuum. The batch is cooled to room temperature and the pale-yellow suspension of the acid chloride is mixed with 5.8 g. of diphenyl-4-carboxylic acid hydrazide and 20 ml. of dry pyridine. The whole is stirred for 2 hours at 100 to 110° C. and then heated to reflux. Between 160 and 170° C. 10 ml. of thionylchloride are dropped within 15 minutes into the grey-biege suspension, whereupon a dark solution is obtained which is stirred on for 15 minutes at the same temperature, then cooled to room temperature and the condensation product is precipitated with alcohol. Crystallization from chlorobenzene+isopropanol with the aid of bleaching earth furnishes 6.5 g. of the compound of the formula

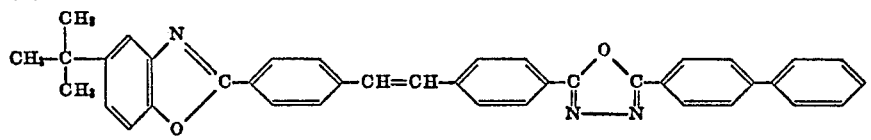

as a pale-yellow, crystalline powder melting at 318 to 320° C.

$C_{39}H_{31}O_2N_3$—Calculated: C, 81.65%; H, 5.45%; N, 7.33%. Found: C, 81.38%; H, 5.24%; N, 7.53%.

The 4-[5″-tertiary butyl-benzoxazolyl-(2″)]-stilbene-4′-carboxylic acid used as starting material is prepared in the following manner:

15.7 grams of stilbene-4,4′-dicarboxylic acid ethyl ester chloride of the Formula 19 are condensed with 6.1 g. of 3-amino-4-hydroxy-tertiary butylbenzene as described for the manufacture of the compound of the Formula as a light-yellow, crystalline powder melting at 172 to 173° C. Crystallization from toluene+cyclohexane with addition of bleaching earth furnishes yellowish tinsel melting at 177 to 178° C.

$C_{28}H_{27}O_3N$: mol. weight, 425.50. Calculated: C, 79.03%; H, 6.40%; N, 3.29%. Found: C, 78.83%; H, 6.60%; N, 3.52%.

A mixture of 60 g. of ethyl ester of the Formula 45 and 1200 ml. of ethyleneglycol monomethyl ether is heated to refluxing, whereby a thin, yellow suspension is obtained. Within 15 minutes a solution of 11 g. of caustic soda in 100 ml. of water is dropped in, and a thick suspension forms which is refluxed for one hour, cooled to room temperature, suctioned, washed with methanol and dried. The powdered sodium salt is then suspended in 1 litre of dimethylformamide and 25 ml. of formic acid are added, whereupon a clear solution is obtained which is poured into 5 litres of cold water; the floccular precipitate is suctioned off and the residue is washed with water until the washings run neutral to Congo red. After drying there are obtained about 41 g. of the carboxylic acid of the Formula 43 melting at 348 to 349° C. which is used for the following condensation without previous purification.

The following benzoxazolyl-oxdiazolyl-stilbene compounds can be prepared in a similar manner:

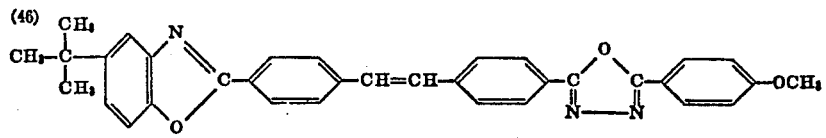

Pale yellow, small needles from toluene, melting at 293 to 294° C.

$C_{34}H_{29}O_3N_3$: mol. weight, 527.60. Calculated C, 77.40%; H, 5.54%; N, 7.97%. Found: C, 77.63%; H, 5.52%; N, 7.88%.

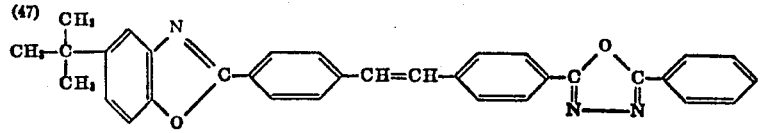

Pale yellow, small needles from ethyl acetate, melting at 262 to 263° C.

$C_{33}H_{27}O_2N_3$: mol. weight, 497.57. Calculated: C, 79.65%; H, 5.47%; N, 8.45%. Found: C, 79.60%; H, 5.68%; N, 8.35%.

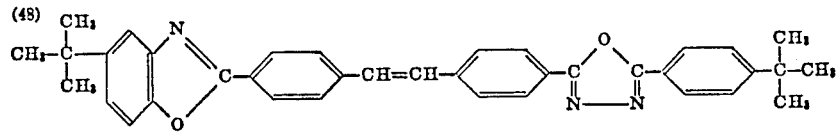

Yellow, crystalline powder from toluene+isopropanol, melting at 280 to 282° C.

$C_{37}H_{35}O_2N_3$: mol. weight, 553.67. Calculated: C, 80.26%; H, 6.37%; N, 7.59%. Found: C, 79.83%; H, 6.33%; N, 7.34%.

Example 4

A mixture of 9.5 g. of 4-[5″-phenyl-benzoxazolyl-(2″)]-stilbene-4′-carboxylic acid of the formula

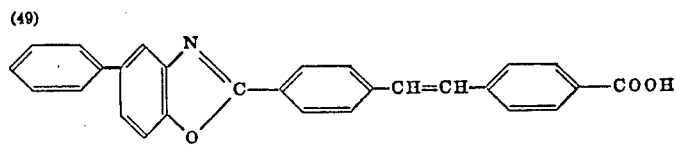

125 ml. of ortho-dichlorobenzene, 20 ml. of thionylchloride and 3 drops of pyridine is heated within 4 hours at 90 to 95° C., during which hydrochloric acid escapes and a clear solution forms. The excess thionylchloride is completely evaporated under vacuum, the residue cooled to room temperature and the faintly yellow suspension of the acid chloride is mixed with 4.4 g. of 4-tertiary butyl-benzhydrazide and 20 ml. of dry pyridine. The batch is stirred for 2 hours at 100 to 110° C. and then heated to the reflux temperature, whereby a very thin suspension is obtained. In the course of 15 minutes 10 ml. of thionylchloride are then dropped in at a rate such that the boiling temperature does not drop below 160° C. The batch is stirred on for 15 minutes at the reflux temperature, then allowed to cool and the reaction product is precipitated with methanol. Crystallization from xylene with the aid of bleaching earth furnishes 6.5 g. of the compound of the formula in the form of small, yellow needles melting at 320 to 322° C.

$C_{39}H_{31}O_2N_3$: mol. weight, 573.66. Calculated: C, 81.65%; H, 5.45%; N, 7.33%. Found: C, 81.45%; H, 5.49%; N, 7.37%.

The 4-[5″-phenyl-benzoxazolyl-(2″)]-stilbene-4′-carboxylic acid of the Formula 49 used as starting material can be prepared in the following manner:

125.9 grams of stilbene-4,4′-dicarboxylic acid ethyl ether chloride of the Formula 19 are condensed with 74.1 g. of 3-amino-4-hydroxydiphenyl as described for the manufacture of the compound of the Formula 20, to yield 115 g. of 4-[5″-phenyl-benzoxazolyl-(2″)]-stilbene-4′-carboxylic acid ethyl ester of the formula

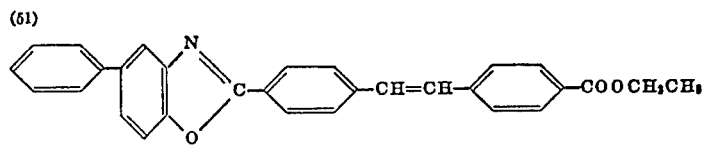

in the form of small, faintly yellowish needles from xylene, melting at 277 to 278° C.

$C_{30}H_{23}O_3N$: mol. weight, 445.49. Calculated: C, 80.88%; H, 5.20%; N, 3.14%. Found: C, 80.62%; H, 5.10%; N, 3.32%.

20 grams of ethyl ester of the Formula 51 are saponified in 500 ml. of ethyleneglycol monomethyl ether with 5.5 g. of caustic soda in 50 ml. of water as described for the ethyl ester of the Formula 45. The resulting free carboxylic acid (17.0 g. of a light-yellow powder melting at 346 to 347° C.) of the Formula 49 is used in the following condensation without first having been purified.

The following benzoxazolyl-oxdiazolyl-stilbene compound is obtained in a similar manner:

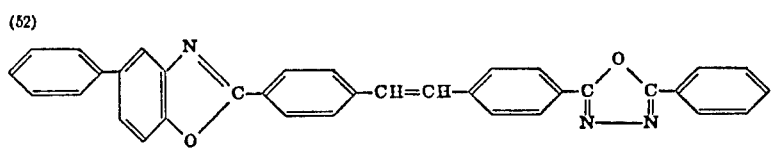

Yellowish flakes from ortho-dichlorobenzene, melting at 276 to 279° C.

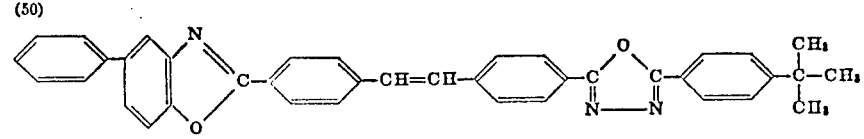

$C_{35}H_{23}O_2N_3$: mol. weight, 517.59. Calculated: C, 81.22%; H, 4.48%; N, 8.12%. Found: C. 80.95%; H, 4.56%; N, 8.15%.

Example 5

A mixture of 9.5 g. of 4-[6''-phenylbenzoxazolyl-(2'')]-stilbene-4'-carboxylic acid of the formula

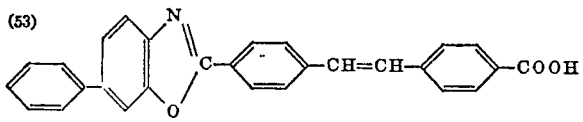

150 ml. of ortho-dichlorobenzene, 20 ml. of thionylchloride and 3 drops of pyridine is heated for 4 hours at 90 to 100° C., during which hydrochloric acid escapes and a clear solution is obtained. The excess thionylchloride is then completely evaporated under vacuum. The residue is cooled to room temperature and the suspension of the acid chloride is mixed with 4.4 g. of 4-tertiary butylbenzhydrazide and 20 ml. of dry pyridine, heated with stirring for 2 hours at 100 to 110° C. and further heated to reflux. Within 15 minutes 10 ml. of thionylchloride are dropped in at a rate such that the reflux temperature does not drop below 160° C. The batch is refluxed for another 15 minutes, cooled to room temperature, and the precipitate is suctioned off and rinsed with methanol. On crystallization from dichlorobenzene with the aid of bleaching earth, followed by crystallization from dimethylformamide, there are obtained 7.8 g. of the compound of the formula

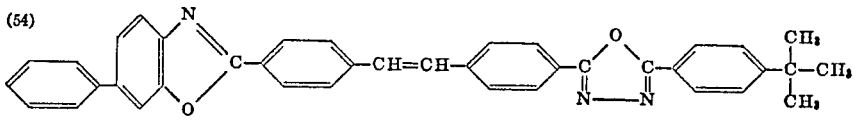

in the form of brilliant yellow, small needles melting at 293 to 295° C.

$C_{39}H_{31}O_2N_3$: mol. weight, 573.66. Calculated: C, 81.65%; H, 5.45%; N, 7.33%. Found: C, 81.62%; H, 5.55%; N, 7.46%.

The 4-[6''-phenylbenzoxazolyl-(2'')]-stilbene-4'-carboxylic acid of the Formula 53 used as starting material can be prepared thus:

63 grams of stilbene-4,4'-dicarboxylic acid ethyl ester chloride of the Formula 19 are condensed with 37.4 g. of 4-amino-3-hydroxydiphenyl as described for the compound of the Formula 20, to yield 61.8 g. of 4-[6''-phenylbenzoxazolyl-(2'')]-stilbene-4'-carboxylic acid ethyl ester of the formula

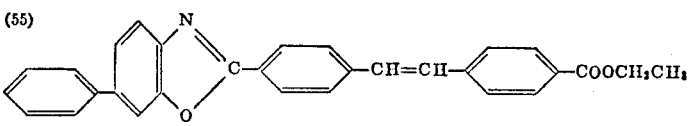

in the form of a light-yellow, crystalline powder (from ortho-dichlorobenzene), melting at 213 to 216° C.

$C_{30}H_{23}O_3N$: mol. weight, 445.49. Calculated: C, 80.88%; H, 5.20%; N, 3.14%. Found: C, 80.94%; H, 5.04%; N, 3.34%.

12.3 grams of the ethyl ester of the Formula 55 are saponified in 310 ml. of ethyleneglycol monomethyl ether with 3.4 g. of caustic soda in 30 ml. of water as described for the ethyl ester of the Formula 45, to yield 10.5 g. of the free carboxylic acid of the Formula 53 as a faintly yellow powder melting at 348 to 350° C. which is used for the following condensation without first having been purified.

Example 6

A mixture of 6.6 g. of the carboxylic acid chloride of the formula

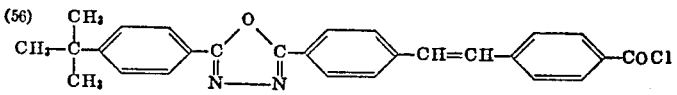

3.0 g. of 2-amino-4-benzylphenol and 20 ml. of anhydrous dichlorobenzene is heated to reflux, during which hydrochloric gas escapes. When the evolution of hydrochloric acid has stopped, 15 ml. of diethyleneglycol dibutyl ether and 300 mg. of boric anhydride are added to the thick, yellow suspension; the dichlorobenzene is distilled off under nitrogen drop by drop until a temperature of 230 to 235° C. has been reached, during which water escapes and a dark solution is obtained which is stirred for 30 minutes at this temperature and then allowed to cool. The resulting thick paste is dissolved in boiling xylene. The solution is clarified by filtration and concentrated and the precipitate filtered off and washed with alcohol.

There are obtained 8.2 g. of a yellow powder melting at 279 to 280.5° C. On a further crystallization from xylene with the aid of bleaching earth there are obtained 5.5 g. of the compound of the formula

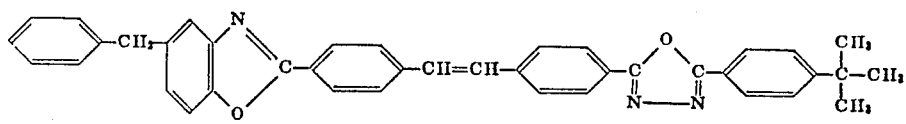

in the form of lemon-coloured flakes melting at 281 to 282° C.

$C_{40}H_{33}O_2N_3$: mol. weight, 587.69. Calculated: C, 81.74%; H, 5.66%; N, 7.15%. Found: C, 81.55%; H, 5.68%; N, 7.13%.

The 4-[5"-(4'''-tertiary butylphenyl-(1'''))-1",3",4"-oxdiazolyl-(2")]-stilbene-4-carboxylic acid chloride of the Formula 56 used as starting material can be prepared in the following manner:

A suspension of 192.2 g. of 4-tertiary butylbenzhydrazide and 314.7 g. of stilbene-4,4'-dicarboxylic acid ethyl ester chloride of the Formula 19 in 3 litres of dry orthodichlorobenzene is mixed with 160 ml. of anhydrous pyridine and stirred for 2 hours at 100 to 110° C., whereby a thinly liquid, light-beige suspension is formed which is heated to reflux, whereupon a dark solution is obtained. Within 45 minutes 120 ml. of thionylchloride are dropped in at a rate such that the reflux temperature always remains above 165° C. The batch is stirred for another 15 minutes at the reflux temperature, the bulk of the solvent is evaporated under atmospheric pressure and alcohol is added. The whole is suctioned at room temperature, rinsed with alcohol and after drying there are obtained 277 g. of a brown-beige coloured powder melting at 187 to 191° C. Crystallization from tetrachloroethylene with the aid of bleaching earth furnishes 240 g. of the oxdiazolyl-stilbene compound of the formula

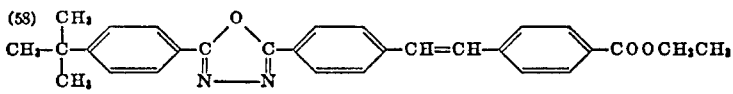

in the form of a light-beige coloured powder.
$C_{29}H_{28}O_3N_2$: mol. weight, 452.53. Calculated: C, methyl ether are refluxed, whereupon a clear solution is obtained. Within 15 minutes a solution of 40 g. of caustic soda in 200 ml. of water are dropped in, whereupon a thick, yellowish suspension is obtained which is refluxed for another hour and then allowed to cool to room temperature and suctioned. The residue is washed with methylcellosolve and chloroform and dried, to yield 160 g. of the sodium salt of the formula

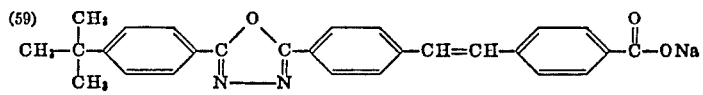

in the form of a yellow powder which is suspended in 2 litres of chlorobenzene at 80° C. Within 10 minutes 100 ml. of thionylchloride are run in, whereupon a turbid solution is obtained which is stirred for another 10 minutes. The precipitated sodium chloride is suctioned off and the clear filtrate evaporated to dryness under vacuum, to yield 144 g. of the acid chloride of the formula

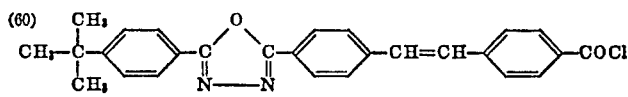

in the form of a yellow powder which melts clearly at 241 to 245° C.

The following benzoxazolyl-oxdiazolyl compounds can be prepared in a similar manner:

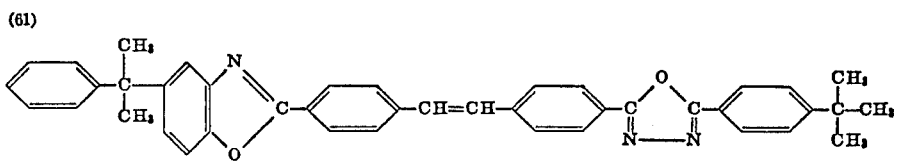

Yellow, crystalline powder from toluene, melting at 252 to 253° C.
$C_{42}H_{37}O_2N_3$: mol. weight, 615.74. Calculated: C, 81.92%; H, 6.06%; N, 6.82%. Found: C, 81.92%; H, 6.04%; N, 6.72%.

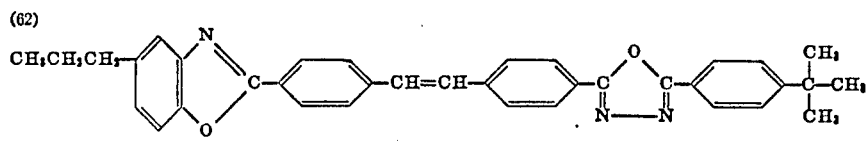

76.97%; H, 6.24%; N, 6.19%. Found: C, 76.67%; H, 6.20%; N, 6.10%.

202.7 grams of oxdiazolyl-stilbene-carboxylic acid ester of the Formula 58 in 2 litres of ethyleneglycol mono- Yellow, crystalline powder from toluene, melting at 273 275° C.
$C_{36}H_{33}O_2N_3$: mol. weight, 539.65. Calculated: C, 80.12%; H, 6.16%; N, 7.79%. Found: C, 79.72%, H, 6.11%; N, 7.77%.

(63)

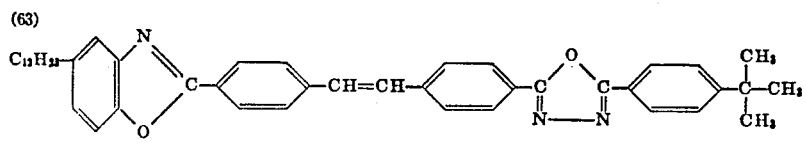

Yellow beige coloured crystalline powder from ethyl acetate, melting at 188 to 190° C.

80.86%; H, 7.27%; N, 6.74%. Found: C, 81.00%; H, 7.25%; N, 6.69%.

(67)

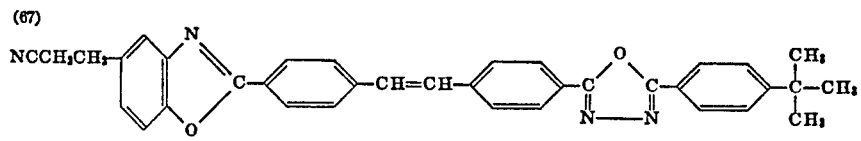

$C_{45}H_{51}O_2N_3$—Calculated: C, 81.16%; H, 7.72%; N, 6.31%. Found: C, 80.95%; H, 7.63%; N, 6.46%.

Light-beige, small needles from xylene, melting at 313 to 315° C.

(64)

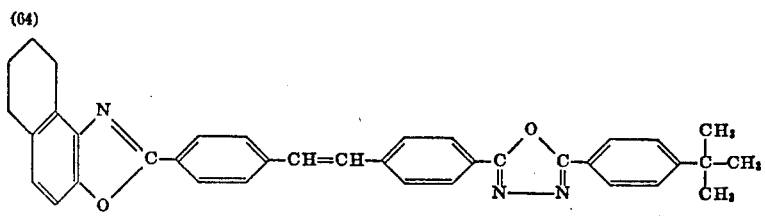

Light-yellow, crystalline powder from xylene, melting at 253 to 255° C.

$C_{37}H_{33}O_2N_3$: mol. weight, 551.66. Calculated: C, $C_{36}H_{28}O_2N_4$: mol. weight, 548.62. Calculated: C, 78.81%; H, 5.14%; N, 10.21%. Found: C, 78.62%; H, 5.45%; N, 10.18%.

(68)

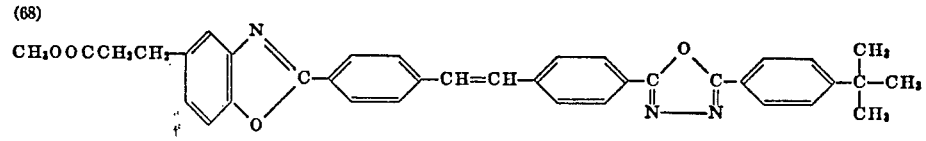

80.55%; H, 6.03%; N, 7.62%. Found: C, 80.30%; H, 6.09%; N, 7.47%.

Light-yellow, small needles from toluene, melting at 272 to 274° C.

(65)

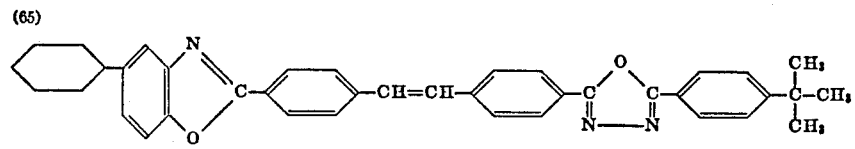

Yellow, crystalline powder from xylene, melting at 290 to 292° C.

$C_{39}H_{37}O_2N_3$: mol. weight, 579.71. Calculated: C, $C_{37}H_{33}O_4N_3$: mol. weight, 583.66. Calculated: C, 76.14%; H, 5.70%; N, 7.20%. Found: C, 76.06%; H, 5.68%; N, 7.28%.

(69)

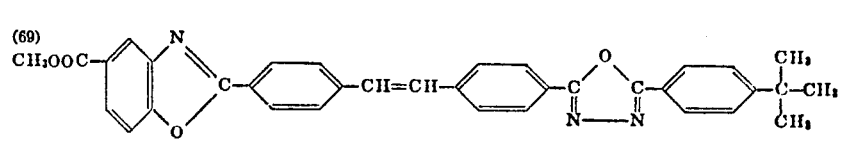

80.80%; H, 6.43%; N, 7.25%. Found: C, 80.58%; H, 6.46%; N, 7.24%.

Light-yellow flakes from chlorobenzene, melting at 323 to 325° C.

(66)

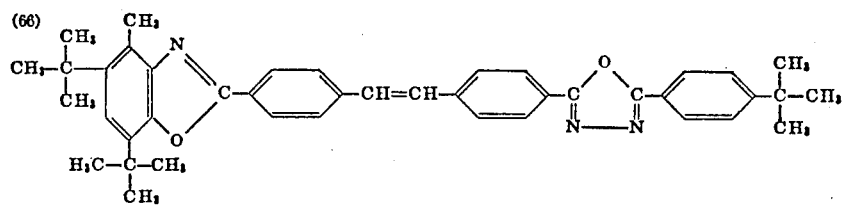

Yellowish, crystalline powder from cyclohexane, melting at 245 to 246° C.

$C_{42}H_{45}O_2N_3$: mol. weight, 623.80. Calculated: C, $C_{35}H_{29}O_4N_3$: mol. weight, 555.61. Calculated: C, 75.66%; H, 5.26%; N, 7.56%. Found: C, 75.42%; H, 5.31%; N, 7.46%.

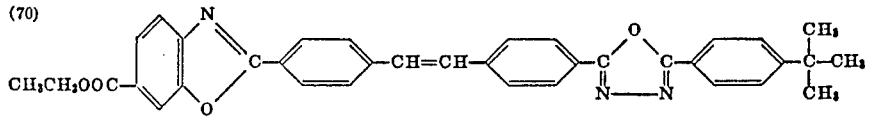

Brilliant yellow, crystalline powder from xylene, melting at 298 to 300° C.

$C_{36}H_{31}O_4N_3$: mol. weight, 569.63. Calculated: C, 75.90%; H, 5.49%; N, 7.38%. Found: C, 75.97%; H, 5.52%; N, 7.47%.

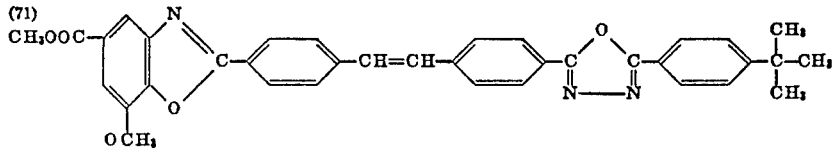

Fine, greenish yellow needles from toluene, melting at 232 to 234° C.

$C_{36}H_{31}O_5N_3$: mol. weight, 585.63. Calculated: C, 73.83%; H, 5.34%; N, 7.18%. Found: C, 73.33%; H, 5.33%; N, 7.05%.

A suspension of 124 g. of the carboxylic acid of the Formula 72 in 200 ml. of dry dichlorobenzene is mixed with 300 ml. of thionylchloride and a few drops of pyridine and stirred for 12 hours at 90 to 95° C., whereupon a yellow-greenish suspension is obtained which is heated to the reflux temperature in the course of one hour, during which the excess thionylchloride passes over, but no solution is obtained. The batch is suctioned at room temperature and the residue washed with anhydrous dichlorobenzene and then with dry hexane, to yield 125 g. of the acid chloride of the formula

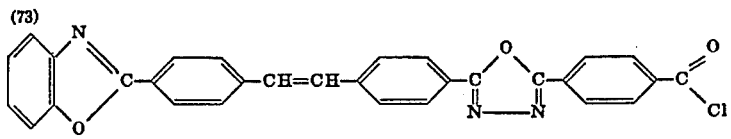

in the form of small, yellow needles which melt at 350° C. with decomposition.

Example 7

130 g. of the methyl ester of the Formula 16 in 3 litres of boiling ethyleneglycol monomethyl ether are mixed dropwise within 30 minutes with 21 g. of caustic soda in 100 ml. of water. The initially thinly liquid, finely granular suspension slowly turns into a thinly liquid paste. When the dropwise addition is complete, the batch is stirred for another 5 hours under reflux and then 60 ml. of formic acid are run in within 5 minutes. After refluxing for another 10 minutes the batch is cooled to room temperature. The thick, yellow suspension is suctioned, and the residue washed first with a small amount of ethyleneglycol monomethyl ether and then with water until the washings run neutral to Congo red. After drying there are obtained 125 g. of the carboxylic acid of the formula

Example 8

A suspension of 7.55 g. of the acid chloride of the Formula 73 in 50 ml. of anhydrous chlorobenzene is mixed with 5 g. of 1-octadecanol and 2 ml. of anhydrous pyridine and refluxed for 6 hours, then allowed to cool, the pale-yellow precipitate is suctioned off and the residue is washed with acetone. Two recrystallizations from ortho-dichlorobenzene with the aid of bleaching earth furnish 6.1 g. of the compound of the formula

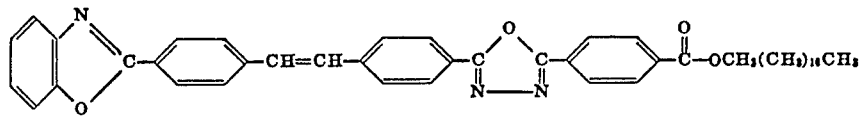

in the form of a light-yellow powder melting at 268 to 270° C.

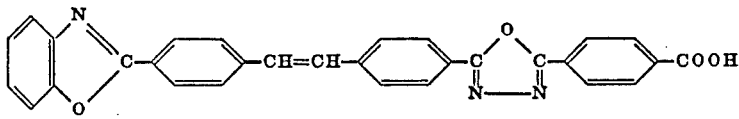

in the form of a light-yellow powder which does not melt below 250° C. Recrystallization from dimethylformamide furnishes a light-yellow, finely crystalline powder which does not melt below 350° C.

$C_{48}H_{55}O_4N_3$: mol. weight, 737.94. Calculated: C, 78.12%; H, 7.51%; N, 5.69%. Found: C, 77.81%; H, 7.46%; N, 5.71%.

The following benzoxazolyl-oxdiazolyl-stilbene compounds can be prepared in a similar manner:

(75)
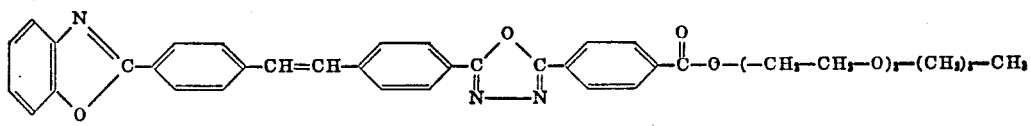

Pale-yellow, crystalline powder from chlorobenzene, melting at 265 to 266° C.

$C_{40}H_{31}O_4N_3$: mol. weight, 617.67. Calculated: C, 77.78%; H, 5.06%; N, 6.80%. Found: 77.59%; H, 4.99; N, 7.00%.

(79)
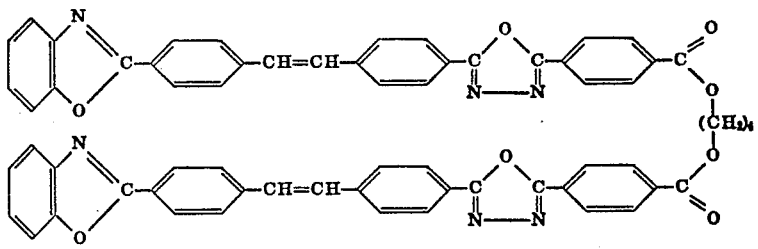

$C_{38}H_{35}O_6N_3$—Calculated: C, 72.48%; H, 5.60%; N, 6.67%. Found: C, 72.23%; H, 5.58%; N, 6.84%.

Light-beige, crystalline powder from trichlorobenzene, which does not melt below 350° C.

(76)
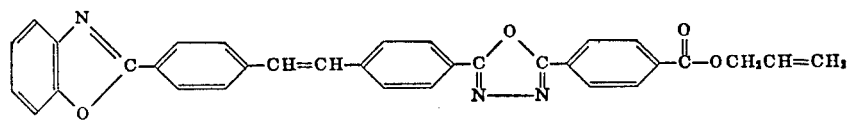

Light-yellow, felted, small needles from ortho-dichlorobenzene, melting at 320° C.

$C_{33}H_{23}O_4N_3$: mol. weight, 525.54. Calculated: C, 75.41%; H, 4.41%; N, 8.00%. Found: C, 75.62%; H, 4.43%; N, 7.89%.

$C_{64}H_{44}O_8N_6$: mol. weight, 1025.09. Calculated: C, 74.99%; H, 4.33%; N, 8.20%. Found: C, 74.54; H, 4.19; N, 8.32%.

Example 9

A mixture of 5.03 g. of the acid chloride of the Formula 73, 200 ml. of anhydrous dichlorobenzene and 10 ml.

(77)
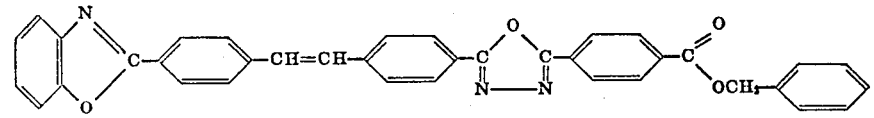

Small, yellow, felted needles from ortho-dichlorobenzene, melting at 302 to 304° C.

$C_{37}H_{25}O_4N_3$: mol. weight, 575.59. Calculated: C, 77.20%; H, 4.38; N, 7.30%. Found: C, 77.44%; H, 4.44%; N, 7.41%.

of 2-phenylethylamine is refluxed for 1 hour, then cooled to room temperature, suctioned and the residue is washed with methanol, to yield 5.1 g. of a light-beige coloured powder which forms a turbid melt at 308 to 312° C.

(78)
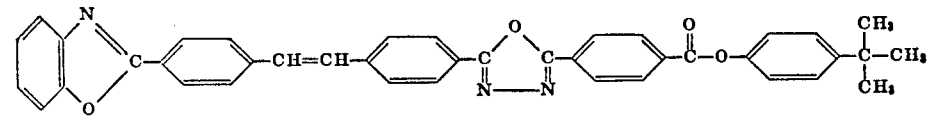

Small, pale-yellow needles from xylene, M.P. 354–356° C.

On crystallization from dichlorobenzene and clarification with activated alumina, the compound of the formula (80)

is obtained in the form of yellowish needles melting at 316 to 318° C.

(85)
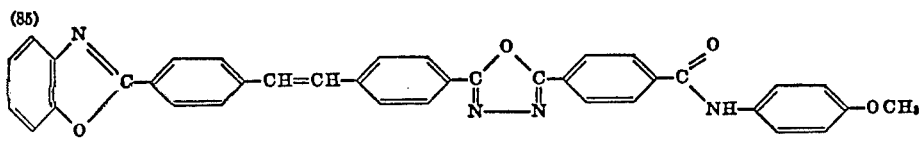

C₃₈H₂₈O₃N₄: mol. weight, 588.64. Calculated: C, 77.53%; H, 4.79%; N, 9.52%. Found: C, 77.34; H, 4.90%; N, 9.44%.

The following benzoxazolyl-oxdiazolyl-stilbene compounds can be prepared in a similar manner:

(81)
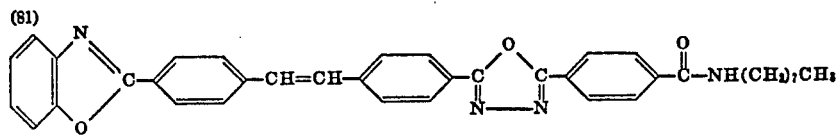

Yellowish, small felted needles from ortho-dichlorobenzene, melting above 320° C. with decomposition.

C₃₈H₃₆O₃N₄: mol. weight, 596.70. Calculated: C, 76.48%; H, 6.08%; N, 9.39%. Found: C, 76.24%; H, 6.12; N, 9.29%.

(82)
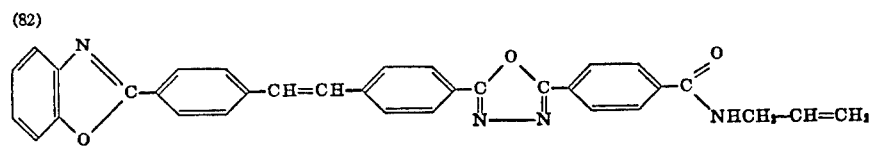

Shiny, silvery tinsel from ortho-dichlorobenzene, melting at 320° C. with decomposition.

C₃₃H₂₄O₃N₄: mol. weight, 524.55. Calculated: C, 75.56%; H, 4.61%; N, 10.68%. Found: C, 75.35%; H, 4.59%; N, 10.58%.

(83)
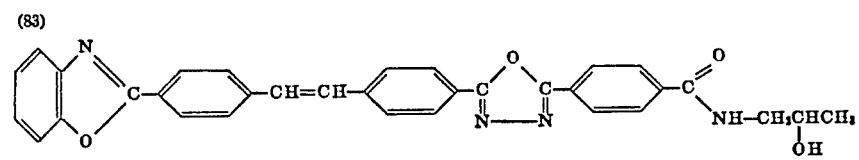

Pale-yellow tinsel from ortho-dichlorobenzene, melting at 305° C. with decomposition.

C₃₃H₂₆O₄N₄: mol. weight, 542.57. Calculated: C, 73.05%; H, 4.83%; N, 10.33%. Found: C, 72.88%; H, 4.94%; N, 10.40%.

(84)
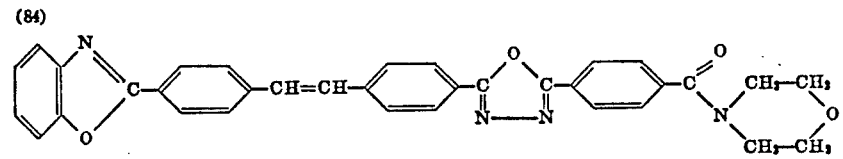

Small, yellow needles from ortho-dichlorobenzene, melting at 288 to 290° C.

C₃₄H₂₆O₄N₄: mol. weight, 554.58. Calculated: C, 73.63%; H, 4.73%; N, 10.10%. Found: C, 73.90%; H, 4.93%; N, 10.17%.

Pale-yellow tinsel from trichlorobenzene, not melting below 350° C.

C₃₇H₂₆O₄N₄: mol. weight, 590.61. Calculated: C, 75.24%; H, 4.66%; N, 9.48%. Found: C, 75.09%; H, 4.53%; N, 9.44%.

*Example 10*

A suspension of 51.5 g. of the methyl ester of the Formula 69 in 1200 ml. of ethyleneglycol monomethyl ether is heated to reflux, whereupon a thin suspension is obtained. While stirring it well, 8 g. of caustic soda in 20 ml. of water are dropped in within 15 minutes, whereby a thick yellow suspension is obtained. The whole is refluxed for another hour and then vigorously stirred into 3 liters of water and mixed with 80 ml. of concentrated hydrochloric acid. The precipitate is suctioned off and the residue washed with water and sucked dry. The residue is then dissolved in dimethylformamide, an undissolved turbidity is filtered off and the whole is considerably concentrated and then allowed to cool. The crystalline precipitate is suctioned off, washed with a small amount of dimethylformamide and methanol and dried, to yield 46.8 g. of a yellow powder which does not melt below 350°

C. Recrystallization from dimethylformamide furnishes the carboxylic acid of the formula (86)

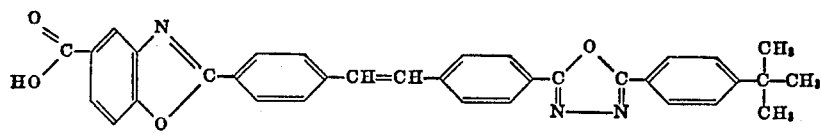

in the form of yellow flakes which do not melt below 350° C.

$C_{34}H_{27}O_4N_3$: mol. weight, 541.58. Calculated: C, 75.40%; H, 5.03%; N, 7.76%. Found: C, 75.57%; H, 5.22%; N, 8.03%.

Example 11

A mixture of 44.5 g. of the carboxylic acid of the Formula 86, 350 ml. of dry chlorobenzene and 100 ml. of thionylchloride is stirred overnight at 100° C. whereupon the temperature is raised to 120° C. within one hour. The batch is allowed to cool, finally cooled in an ice bath, suctioned at 10° C. and the residue is washed with dry chlorobenzene and hexane. After drying with exclusion of air there are obtained 36.5 g. of the acid chloride of the formula (87)

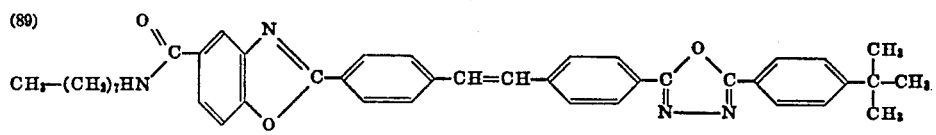

in the form of a yellow powder which melts at 282° C. with decomposition.

(90)

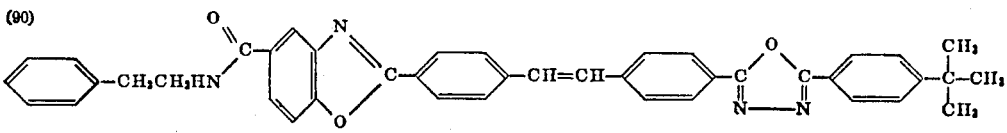

Example 12

A mixture of 4.2 g. of the carboxylic acid chloride of the Formula 87, 130 ml. of dry chlorobenzene and 8 g. of allylamine is refluxed for 2 hours, whereupon a turbid solution is obtained which is suctioned at room temperature and the residue is washed with methanol and dried, to yield 4.1 g. of a light-yellow powder which melts at 300° C. with decomposition. Crystallization from chlorobenzene with the aid of active carbon furnishes the amide of the formula (88)

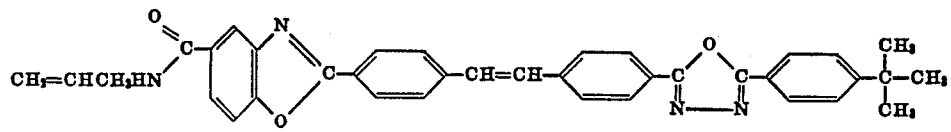

in the form of a light-yellow powder which melts at 300° C. with decomposition.

$C_{37}H_{32}O_3N_4$: mol. weight, 580.66. Calculated: C, 76.53%; H, 5.56%; N, 9.65%. Found: C, 76.64%; H, 5.40%; N, 9.75%.

The following benzoxazolyl-oxdiazolyl-stilbene compounds can be prepared in a similar manner:

(89)

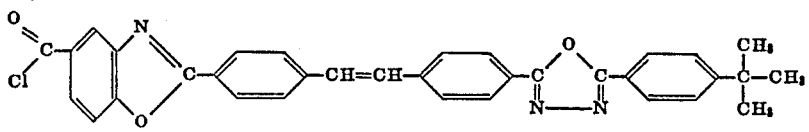

Small, light-yellow needles from chlorobenzene, melting at 300 to 303° C.

$C_{42}H_{44}O_3N_4$: mol. weight, 652.80. Calculated: C, 77.27%; H, 6.79%; N, 8.58%. Found: C, 77.57%; H, 6.90%; N, 8.74%.

Small, yellow needles from ortho-dichlorobenzene, melting at 314 to 315° C.

$C_{42}H_{36}O_3N_4$: mol. weight, 644.74. Calculated: C, 78.24; H, 5.63; N, 8.69%. Found: C, 78.00%; H, 5.63%; N, 8.91%.

(91)

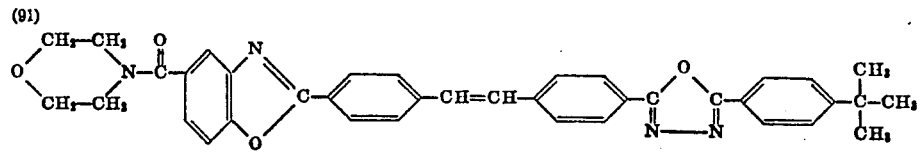

Pale-yellow, small needles from chlorobenzene, melting at 299 to 300° C. with decomposition.

$C_{38}H_{34}O_4N_4$: mol. weight, 610.68. Calculated: C, 74.73%; H, 5.61%; N, 9.18%. Found: C, 74.65%; H, 5.61%; N, 9.28%.

$C_{41}H_{33}O_4N_3$: mol. weight; 631.73. Calculated: C, 77.95%; H, 5.27%; N, 6.65%. Found: C, 77.83%; H, 5.34%; N, 6.65%.

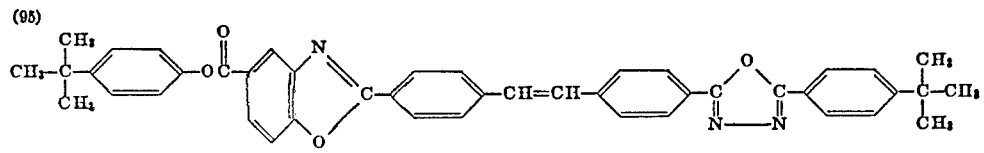

Example 13

A mixture of 4.2 g. of the carboxylic acid chloride of the Formula 87, 2.5 g. of 1-octadecanol, 30 ml. of Yellow, granular powder from chlorobenzene, melting at 324 to 326° C.

$C_{44}H_{39}O_4N_3$: mol. weight, 673.78. Calculated: C, 78.43%; H, 5.83%; N, 6.24%. Found: C, 78.03%; H, 5.82%; N, 6.43%.

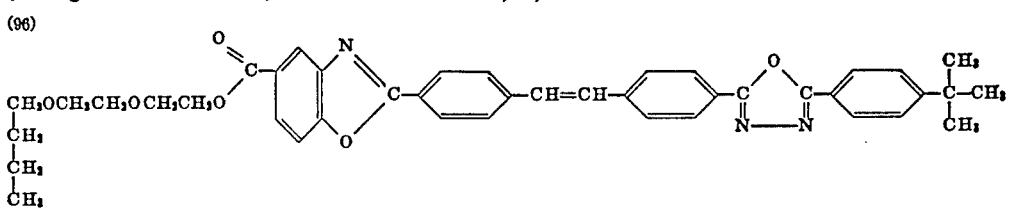

anhydrous chlorobenzene and 1 ml. of pyridine is refluxed for 4 hours, then allowed to cool, the precipitate is suctioned off at room temperature and washed with a small amount of chlorobenzene and hexane. The light-beige coloured residue is dissolved in 400 ml. of boiling dichlorobenzene, clarified with active carbon, considerably concentrated and allowed to crystallize. After drying there are obtained 3.8 g. of a pale-yellow, crystalline powder melting at 245 to 250° C. Recrystallization from chlorobenzene furnishes the compound of the formula Yellow, crystalline powder from chlorobenzene, melting at 247 to 250° C.

$C_{42}H_{43}O_6N_3$: mol. weight, 685.79. Calculated: C, 73.55%; H, 6.32%; N, 6.13%. Found: C, 73.55%; H, 6.22%; N, 6.27%.

Example 14

A polyester fabric (for example Dacron) is padded at room temperautre (about 20° C.) with an aqueous dispersion containing per litre 2 g. of the compound of the

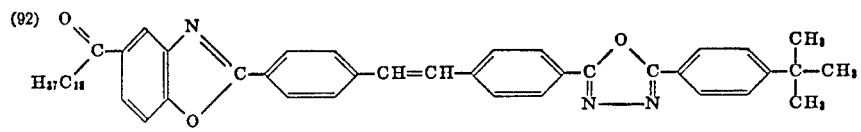

in the form of a light-yellow, granular powder melting at 250 to 255° C.

$C_{52}H_{63}O_4N_3$: mol. weight, 794.09. Calculated: C, 78.65%; H, 8.00%; N, 5.29%. Found: C, 78.73%; H, 7.90%; N, 5.35%.

The following benzoxazolyl-oxdiazolyl compounds can be prepared in a similar manner:

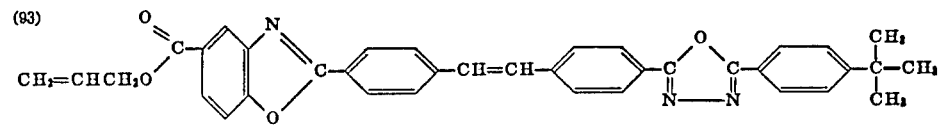

Small, lemon coloured needles from chlorobenzene, melting at 289 to 291° C.

$C_{37}H_{31}O_4N_3$: mol. weight, 581.64. Calculated: C, 76.40%; H, 5.37%; N, 7.23%. Found: C, 76.18%; H, 5.61%; N, 7.42%.

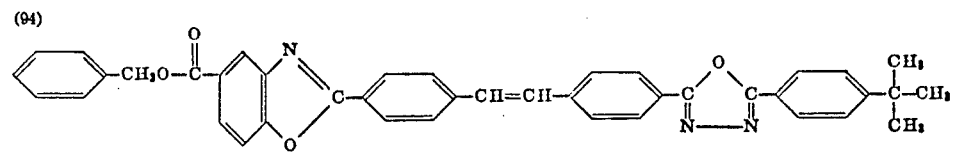

Greenish yellow flakes from chlorobenzene, melting at 272 to 273° C.

Formula 12 or 14 and 1 g. of an adduct from about 8 mols of ethylene oxide with 1 mol of para-tertiary octyl-phenol, and then dried at about 100° C. The dry material is subjected to a heat treatment at 150 to 220° C. which, according to the temperature used, lasts from 2 minutes to a few seconds. The material treated in this manner has a substantially whiter aspect than the untreated material.

Example 15

100 grams of a polyester granulate from polyterephthalic acid ethyleneglycol ester are intimately mixed with 0.05 g. of the stilbene derivative of the Formula 12, 13 or 14 and melted with stirring at 285° C. The spinning mass is spun through usual spinnerets, and strongly brightened polyester fibres are obtained.

If desired, the compound of the Formula 12, 13 or 14 may alternatively be added to the starting materials before or during the polycondensation leading to the polyester.

Example 16

10 kilograms of a polyamide in chip form, prepared in known manner from hexamethylenediamine adipate, are mixed with 30 g. of titanium dioxide (rutile modification) and 10 g. of the compound of the Formula 12, 13 or 14 for 12 hours in a tumbler. The chips treated in this manner are then melted in a boiler from which the atmospheric oxygen has been displaced with superheated steam and which is heated with oil or diphenyl vapour at 300 to 310° C., and the melt is stirred for half an hour, and then expressed under a nitrogen pressure of 5 atmospheres (gauge) through a spinneret. The cooled filament obtained in this manner is reeled on a cheese. The resulting filaments display an excellent brightening effect which is fast to heat-setting and has good fastness to washing and light.

Instead of the compound of the Formula 12, 13 or 14 there may be used the compound of the formula 16, 29, 30 or 52.

When in this example a polyamide prepared from ε-caprolactam is used as starting material, an excellent brightening effect is likewise obtained which is fast to heat-setting and has good fastness to washing and light.

Example 17

100 grams of polypropylene (fibre grade) are intimately mixed with 0.02 g. of the compound of the Formula 13 or 52 and melted with stirring at 280 to 290° C. After spinning through usual spinnerets and stretching, polypropylene fibres are obtained which display an excellent brightening effect which is fast to light.

What is claimed is:

1. The 4-oxazolyl-4′-oxdiazolyl stilbene of the formula

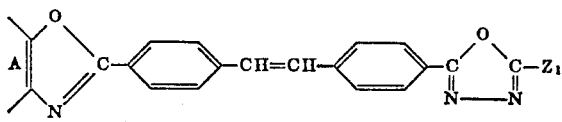

where A represents a member selected from the group consisting of naphthalene, tetrahydronaphthalene and phenylene linked with the oxazolyl ring in the manner indicated by the valency lines and $Z_1$ represents a member selected from the group of consisting of β-pyridyl, 2-furoyl, 2-thienyl, β-naphthyl, β-styryl, 4-stilbenzyl and the benzene residue of the formula

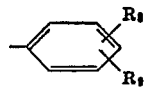

wherein $R_8$ and $R_9$ each represents a member selected from the group consisting of hydrogen, halogen, alkyl having 1–8 carbon atoms, alkoxy having 1–8 carbon atoms, phenyl, carboxyl, carbamoyl, nitrile and carboxylic acid ester of a member selected from the group consisting of alkyl, alkoxyalkyl, alkenyl, aryl and aralkyl, having up to 18 carbon atoms in the ester group.

2. The 4-oxazolyl-4′-oxdiazolyl stilbene of the formula

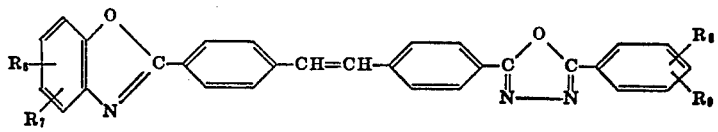

wherein $R_6$ and $R_7$ each represents a member selected from the group consisting of hydrogen, alkyl having 1–18 carbon atoms, cyclohexyl, phenylalkyl having 1–4 carbon atoms in the alkyl group, phenyl, alkyl phenyl having 1–12 carbon atoms, cyanoalkyl having 1–4 carbon atoms, carboxyl, carboxylic acid ester of a member selected from the group consisting of alkyl, alkoxyalkyl, alkenyl, and aralkyl having 1–18 carbon atoms in the ester group, carbamoyl, carbalkoxyalkyl and $R_6$ together with $R_7$ and the benzene ring, tetrahydronaphthalene and $R_8$ and $R_9$ each represents a member selected from the group consisting of hydrogen, halogen, alkyl having 1–8 carbon atoms, alkoxy having 1–8 carbon atoms, phenyl, carboxyl, carboxylic acid ester of a member selected from the group consisting of alkyl, aralkyl, cycloalkyl and aryl having 1–18 carbon atoms in the ester group, carbamoyl, carbamoyl substituted with a member selected from the group consisting of alkyl, alkoxyalkyl, cycloalkyl and aryl, and nitrile.

3. The 4-oxazolyl-4′-oxdiazolyl stilbene of the formula

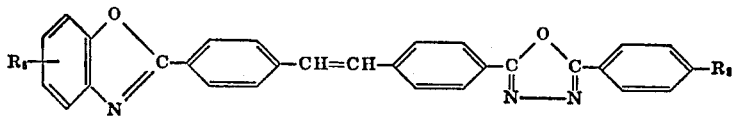

where $R_6$ represents a member selected from the group consisting of alkyl containing up to 18 carbon atoms which is in position 5 or 6, cyclohexyl, phenylalkyl containing 1 to 4 carbon atoms in the alkyl group, phenyl, alkylphenyl containing 1 to 4 carbon atoms in the alkyl group, alkoxy containing up to 12 carbon atoms, cyanoalkyl containing 1 to 4 carbon atoms, carboxyl, carboxylic acid ester of a member selected from the group consisting of alkyl, alkoxyalkyl, alkenyl and aralkyl having 1–18 carbon atoms in the ester group, carbamoyl, carbalkoxyalkyl and $R_8$ a member selected from the group consisting of chlorine, alkyl having 1–8 carbon atoms, alkoxy having 1 to 8 carbon atoms, phenyl, carboxyl, carbamoyl, carbamoyl substituted with a member selected from the group consisting of alkyl, alkoxyalkyl, cycloalkyl and aryl, nitrile and carboxylic acid ester of a member selected from the group consisting of alkyl, aralkyl, cycloalkyl and aryl having up to 18 carbon atoms in the ester group.

4. The compound of the formula

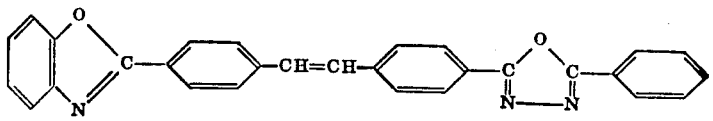

5. The compound of the formula
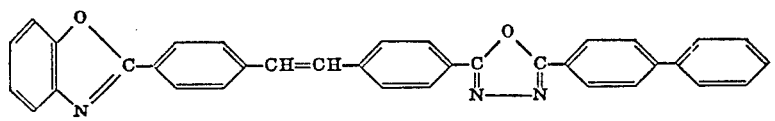
6. The compound of the formula
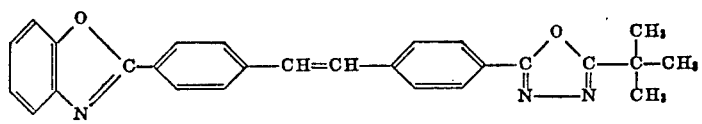
7. The compound of the formula
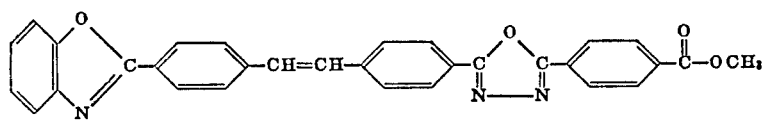
8. The compound of the formula
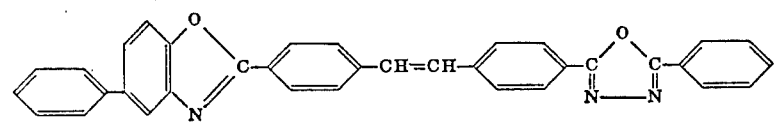
9. The compound of the formula
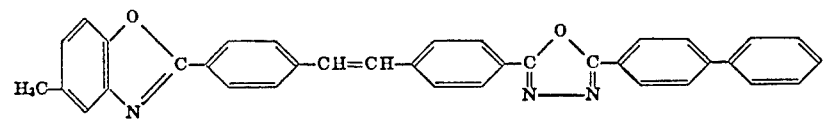
References Cited
UNITED STATES PATENTS
3,133,916  5/1964  Duennenberger et al. __ 260—240
3,260,715  7/1966  Saunders _____ 260—240
JOHN D. RANDOLPH, *Primary Examiner.*